(12) United States Patent
Miyabayashi

(10) Patent No.: US 6,864,302 B2
(45) Date of Patent: Mar. 8, 2005

(54) INK JET RECORDING METHOD AND INK SET THEREFOR

(75) Inventor: Toshiyuki Miyabayashi, Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 79 days.

(21) Appl. No.: 09/952,033

(22) Filed: Sep. 12, 2001

(65) Prior Publication Data

US 2002/0077385 A1 Jun. 20, 2002

(30) Foreign Application Priority Data

Sep. 14, 2000 (JP) .................................... P.2000-280814
Mar. 22, 2001 (JP) .................................... P.2001-083337

(51) Int. Cl.⁷ ........................ C09D 11/10; C08K 9/10; B41J 2/01
(52) U.S. Cl. ..................... 523/160; 523/205; 347/100
(58) Field of Search ............................. 523/160, 161, 523/200, 205, 201; 106/31.27, 31.6; 347/100; 524/555, 556

(56) References Cited

U.S. PATENT DOCUMENTS

| | | | |
|---|---|---|---|
| 2,083,372 A | 6/1937 | Guthmann | 134/29 |
| 5,156,675 A | 10/1992 | Breton et al. | 106/22 |
| 5,183,502 A | 2/1993 | Meichsner et al. | 106/22 K |
| 5,196,056 A | 3/1993 | Prasad | 106/15.05 |
| 5,555,008 A * | 9/1996 | Stoffel et al. | 347/100 |
| 6,248,805 B1 * | 6/2001 | Nguyen et al. | 523/160 |
| 6,454,403 B1 * | 9/2002 | Takada et al. | 347/100 |
| 6,511,534 B1 * | 1/2003 | Mishina et al. | 106/31.33 |
| 6,652,634 B1 * | 11/2003 | Akers et al. | 106/31.13 |
| 2003/0029355 A1 * | 2/2003 | Miyabayashi | 106/31.27 |
| 2003/0087988 A1 * | 5/2003 | Nakano et al. | 523/160 |

FOREIGN PATENT DOCUMENTS

| | | |
|---|---|---|
| EP | 947567 A1 * | 10/1999 |
| EP | 1077238 A1 * | 2/2001 |
| EP | 1088863 A1 * | 4/2001 |
| JP | 56147861 | 11/1981 |
| JP | 63299971 | 12/1988 |
| JP | 5202328 | 8/1993 |
| JP | 5339516 | 12/1993 |
| JP | 6106735 | 4/1994 |
| JP | 7145336 | 6/1995 |
| JP | 07-224239 | 8/1995 |
| JP | 794634 | 10/1995 |
| JP | 07-278479 | 10/1995 |
| JP | 859715 | 3/1996 |
| JP | 880665 | 3/1996 |
| JP | 881647 | 3/1996 |
| JP | 8218015 | 8/1996 |
| JP | 8302227 | 11/1996 |
| JP | 8302228 | 11/1996 |
| JP | 8319444 | 12/1996 |
| JP | 08-325498 | 12/1996 |
| JP | 920070 | 1/1997 |
| JP | 925442 | 1/1997 |
| JP | 931360 | 2/1997 |
| JP | 9111165 | 4/1997 |
| JP | 9286939 | 11/1997 |
| JP | 10183046 | 7/1998 |
| JP | 10-251567 | 9/1998 |
| JP | 10-251568 | 9/1998 |
| JP | 11-343439 | 12/1999 |

OTHER PUBLICATIONS

Machine Translatin of JP 10316909 A (1998).*
Office Action with English Translation.
Patent Abstracts of Japan Publication No. 10–251568.
Patent Abstracts of Japan Publication No. 07–224239.
Patent Abstracts of Japan Publication No. 07–278479.
Patent Abstracts of Japan Publication No. 11–343439.
Patent Abstracts of Japan Publication No. 08–325498.
Patent Abstracts of Japan Publication No. 10–251567.

* cited by examiner

Primary Examiner—Callie Shosho
(74) Attorney, Agent, or Firm—Ladas & Parry

(57) ABSTRACT

An ink jet recording method comprising a step of bringing a first ink composition into contact with a second ink composition on a recording medium to form an aggregate, wherein the first ink composition comprises at least a water-soluble organic solvent, water and a coloring agent comprising a coloring material enclosed with a polymer having an anionic group, and wherein the second ink composition comprising at least a water-soluble organic solvent, water and a coloring agent comprising a coloring material enclosed with a polymer having a cationic group. Also disclosed are ink sets suitable for the ink jet recording method.

68 Claims, No Drawings

INK JET RECORDING METHOD AND INK SET THEREFOR

FIELD OF THE INVENTION

The present invention relates to an ink jet recording method and an ink set for used in the ink jet recording method. More specifically, the present invention relates to an ink jet recording method, wherein a high-quality printed image can be obtained on a recording medium such as paper exclusive for ink jet printing (e.g., plain paper, recycled paper, coated paper) and excellent preservation stability is attained, and also relates to an ink set for use in the ink jet recording method.

Particularly, the present invention relates to an ink jet recording method, wherein a high-quality printed image exhibiting an excellent fixing property not only on a Porous recording medium such as plain paper, recycled paper, printing paper, Japanese paper, drawing paper and Kent paper, but also on a recording medium such as paper exclusive for ink jet printing (e.g., coated paper) can be obtained, and also relates to an ink set for use in the ink jet recording method.

BACKGROUND OF THE INVENTION

The ink jet recording system is a printing method of ejecting and splashing small ink droplets through a fine nozzle and attaching these ink droplets on the surface of a recording medium such as paper, thereby forming a letter or a figure.

Examples of the ink jet recording system which is put into practical use include a method of converting electric signals into mechanical signals using an electrostrictive element and intermittently ejecting an ink stored in a nozzle head part, thereby recording a letter or a symbol on the surface of a recording medium, and a method of rapidly heating a portion very close to the ejection part to generate bubbles in an ink stored in a nozzle head part and intermittently ejecting the ink using the cubic expansion due to the bubbles, thereby recording a letter or a symbol on the surface of a recording medium.

The ink for use in this ink jet recording is required to have various characteristics. For example, no blurring and good drying property in the printing on a paper as a recording medium, capability of uniform printing on the surface of various recording mediums, and no mixing of adjacent colors in the multicolor printing such as color printing, are required.

The ink generally used for ink jet recording is an ink obtained by dissolving a water-soluble dye of various types in an aqueous medium. Also, an ink obtained by dispersing a pigment in an aqueous medium is provided. The ink obtained by dispersing a pigment in an aqueous medium is characterized in that the water resistance and light fastness are excellent as compared with the ink using a water-soluble dye.

On the other hand, the pigment has a problem in the dispersion stability when used for an aqueous ink composition. In this case, a dispersant such as polymer dispersant or surfactant is generally used so as to stably disperse the pigment in an aqueous medium.

Furthermore, for the purpose or elevating ejection stability, dispersion stability, printing density and coloring property, an ink using a pigment subjected to a some surface-treatment is proposed. For example, a pigment particle or which surface is treated by oxidation is disclosed in JP-A-8-319444 (the term "JP-A" as used herein means an "unexamined published Japanese patent application"), an encapsulated pigment fine particle is disclosed in JP-B-7-94634 (the term "JP-B" as used herein means an "examined Japanese patent publication") and JP-A-8-59715, and a pigment particle of which surface is graft-polymerized with a polymer is disclosed in JP-A-5-339516, JP-A-8-302227, JP-A-8-302228 and JP-A-8-81647.

In addition to these proposals, for elevating the fixing property of pigment on a recording medium, for example, an ink using a pigment on which a resin having a film forming property is coated at a room temperature by the phase inversion emulsification method is disclosed in JP-A-8-218015, an ink using a pigment on which an anionic group-containing organic polymer compound is coated by the acid dipping method is disclosed in JP-A-9-31360, and an ink using a polymer emulsion obtained by impregnating a coloring material into a polymer fine particle according to the phase inversion emulsification method is disclosed in JP-A-9-286936.

In many cases, the printing quality of conventional inks using a pigment is ensured mainly by suppressing the permeability and thereby allowing a pigment as a coloring material to stay in the vicinity of the paper surface. However, such an ink has a problem in that the blurring greatly differs depending on the kind of paper and the adaptability to all kinds of paper is low. Furthermore, drying of the printed portion takes a time and particularly in the multicolor printing such as color printing, mixing of adjacent colors disadvantageously occurs.

With respect to the means for solving these problems, addition of a penetrant is proposed so as to improve the permeability of ink into paper. For example, a case of using a triethylene glycol monomethyl ether is disclosed in JP-A-56-147861, a case of using ethers such as ethylene glycol, diethylene glycol or triethylene glycol is disclosed in JP-A-9-111165, addition of a diethylene glycol monobutyl ether is disclosed in U.S. Pat. No. 5,156,675, addition of Surfynol 465 (produced by Nisshin Chemistry Co. Ltd.) as a acetylene glycol-type surfactant is disclosed in U.S. Pat. No. 5,183,502, a combination use of diethylene glycol monobutyl ether and Surfynol 465 is disclosed in U.S. Pat. No. 5,196,056, and use of ethers of diethylene glycol in ink is disclosed in U.S. Pat. No. 2,083,372.

The ink using a pigment has been heretofore produced by dispersing a pigment in an aqueous medium using a surfactant or a dispersant such as polymer dispersant, however, in this case, it is difficult to elevate the permeability of ink by using the above-described penetrant while ensuring the dispersion stability of the pigment.

In the case of dispersing a pigment using a surfactant or a dispersant such as polymer dispersant, the dispersant is merely adsorbed to the pigment surface and therefore, when the above-described penetrant is used to improve the permeability, the dispersant adsorbed to the pigment is eliminated due to the storage shearing force upon ejection of ink through a narrow nozzle, as a result, the dispersibility is deteriorated and sometimes, the ejection becomes unstable. Furthermore, when such ink is stored for a long time of period, the pigment is liable to suffer from unstable dispersability in some cases. For solving this problem, a method of increasing the amount of dispersant added may be thought out, however, in this case, the dispersant is highly probably not adsorbed to the pigment surface but dissolved in ink and this readily causes occurrence of blurring at the printing on plain paper or recycled paper or wetting of ink to the periphery of a nozzle, giving rise to factors of unstable ejection. In addition, in the case of ink using a pigment dispersed with aid of a surfactant or a dispersant such as polymer dispersant, the pigment as a coloring component is liable not to remain on the paper fiber surface of the recording medium surface at the printing on plane paper or recycled paper and therefore, a sufficiently high printing density cannot be obtained and poor coloring tends to result.

In general, a dispersant not adsorbed to the pigment surface from the beginning and dissolved in a solution, or a dispersant eliminated from the pigment in an environment afterward has a tendency to elevate the viscosity of ink and for adjusting the viscosity of ink to the range suitable for ink jet recording (a range from 1 to 10 mPa·S) the content of the pigment must be limited. As a result, a sufficiently high printing density cannot be obtained on plain paper or recycled paper and also good coloring cannot be obtained. Therefore, it is difficult to realize a high-quality printing image Furthermore, when an ink filled in the head is stored for a long period of time, the dispersion stability is deteriorated and the ink may not be easily ejected through a printer nozzle.

On the other hand, as for the ink jet recording method, a method of applying a polyvalent metal salt solution to a recording medium and then applying an ink composition containing a dye having at least one carboxyl group is disclosed in JP-A-5-202328. According to this method, for example, JP-A-6-106735 discloses that an insoluble complex is formed from a polyvalent metal ion and a dye and by virtue of the presence of this complex, a high-quality image having water resistance and free of color bleeding can be obtained. Also, a method of attaching a liquid composition comprising an organic compound having two or more cationic groups per one molecule onto a recording medium and then performing the recording with an ink containing an anionic dye is disclosed in JP-A-63-299971.

Furthermore, a technique of reducing the bleeding by bringing a pigment ink comprising a pigment dispersed with a cationic AB block polymer into contact with a pigment ink comprising a pigment dispersed with an anionic AB block polymer is disclosed in JP-A-7-145336; a method of contacting a black ink with a color ink using polymer dispersants different in the polarity for the black ink and the color ink is disclosed in JP-A-8-80665, JP-A-9-20070 and JP-A-9-25442, where generation of feathering is suppressed, blurring in the boundary between adjacent different colors is reduced and excellent coloring property can be obtained; and a method of combining a black ink using a self-dispersion type surface-treated pigment having a cationic group on the carbon black surface with a color ink containing an anionic substance such as anionic dye is disclosed in JP-A-10-183046, where a good color image free from blurring between colors can be realized.

SUMMARY OF THE INVENTION

An object of the present invention is to provide an ink jet recording method, which can form a high-quality image free of blurring, color bleeding and the like and favored with high printing density and excellent coloring and fixing properties not only on plain paper or recycled paper but also on a recording medium such as coated paper, and which exhibits excellent stability such as dispersion stability, ejection stability and storage stability.

Another object of the present invention is to provide an ink set suitably used for the ink jet recording method.

Other objects and effects of the invention will be apparent from the following description.

The present inventors found that the high-quality image free of blurring, color bleeding and the like and favored with high printing density and excellent coloring property can be obtained on a recording medium such as plain paper or recycled paper by an ink jet recording method comprising a step of bringing a first ink composition comprising at least a water-soluble organic solvent, water and a coloring agent comprising a coloring material enclosed with a polymer having an anionic group into contact with a second ink composition comprising at least a water-soluble organic solvent, water and a coloring agent comprising a coloring material enclosed with a polymer having a cationic group, on a recording medium to form an aggregate.

The present inventors also found that the high-quality image free of blurring, color bleeding and the like and favored with high printing density and excellent coloring property can be obtained on a recording medium such as plain paper or recycled paper by an ink jet recording method as described above, wherein said polymer having an anionic group for use in the coloring agent of the first ink composition has a crosslinked structure and/or said polymer having a cationic group for use in the coloring agent of the second ink composition has a crosslinked structure.

The present inventors have also found that when adding anionic polymer fine particles to said first ink composition and/or adding cationic polymer fine particles to said first ink composition, a high-quality image free of blurring, color bleeding and the like and favored with high printing density, excellent coloring and fixing properties and high scratch resistance can be obtained not only on plain paper or recycled paper but also on all kind of recording medium such as coated paper.

The present invention has been made based on these findings.

Embodiments of the Ink Jet Recording Method

In a first embodiment, the recording method of the present invention comprises a step of bringing a first ink composition comprising at least a water-soluble organic solvent, water and a coloring agent comprising a coloring material enclosed with a polymer having an anionic group into contact with a second ink composition comprising at least a water-soluble organic solvent, water and a coloring agent comprising a coloring material enclosed with a polymer having a cationic group, on a recording medium to form an aggregate.

According to the first embodiment of the recording method, a high-quality image free of blurring, color bleeding and the like and favored with high printing density and excellent coloring property can be obtained on a recording medium such as plain paper or recycled paper.

In a second embodiment of the recording method, the first ink composition further comprises anionic polymer fine particles.

That is, the second embodiment of the recording method of the present invention comprises a step of bringing a first ink composition comprising at least anionic polymer fine particles, a water-soluble organic solvent, water and a coloring agent comprising a coloring material enclosed with a polymer having an anionic group into contact with a second ink composition comprising at least a water-soluble organic solvent, water and a coloring agent comprising a coloring material enclosed with a polymer having a cationic group, on a recording medium to form an aggregate.

According to the second embodiment of the recording method, a high-quality image free of blurring, color bleeding and the like and favored with high printing density, excellent coloring and fixing proportion and high scratch resistance can be obtained not only on plain paper or recycled paper but also on all kinds of recording mediums such as coated paper.

In the second embodiment of the recording method of the present invention, anionic polymer fine particles are added to the first ink composition. However, similar effects can be obtained also by adding cationic polymer fine particles to the second ink composition or by adding anionic polymer fine particles and cationic polymer fine particles to the first and second ink compositions, respectively.

In a third embodiment of the recording method, the polymer having an anionic group for use in the coloring agent of the first ink composition has a crosslinked structure and the polymer having a cationic group for use in the coloring agent of the second ink composition has a crosslinked structure.

That is, the third embodiment of the recording method of the present invention comprises a step of bringing a first ink composition comprising at least a water-soluble organic solvent, water and a coloring agent comprising a coloring material enclosed with a polymer having an anionic group and having a crosslinked structure into contact with a second ink composition comprising at least a water-soluble organic solvent, water and a coloring agent comprising a coloring material enclosed with a polymer having a cationtic group and having a crosslinked structure, on a recording medium to form an aggregate.

According to the third embodiment of the recording method, a high-quality image free of blurring, color bleeding and the like and favored with high printing density and excellent coloring property can be obtained on a recording medium such as plain paper or recycled paper. Furthermore, the resistance of the coloring agent against a surfactant or a penetrant such as glycol others is improved, whereby an ink composition having excellent storage stability can be obtained and at the same time, the ink composition can have a good quick drying property.

In the third embodiment of the recording method of the present invention, the ink compositions both comprise "a coloring agent comprising a coloring material enclosed with a polymer having a crosslinked structure". However, similar effects as above can be obtained in other embodiments where one ink composition comprises "a coloring agent comprising a coloring material enclosed with a polymer having an anionic group or a cationic group and having a crosslinked structure" and the other ink composition comprises "a coloring agent comprising a coloring material enclosed with a polymer having an anionic group or a cationic group".

In a fourth embodiment of the recording method of the present invention, the first ink composition in the third embodiment of the recording method further comprises anionic polymer fine particles.

That is, the fourth embodiment of the recording method of the present invention comprises a step of bringing a first ink composition at least anionic polymer fine particles, a water soluble organic solvent, water and a coloring agent comprising a coloring material enclosed with a polymer having an anionic group and having a crosslinked structure into contact with a second ink composition comprising at least a water-soluble organic solvent, water and a coloring agent comprising a coloring material enclosed with a polymer having a cationic group and having a crosslinked structure, on a recording medium to form an aggregate.

According to the fourth embodiment of the recording method, a high-quality image free of blurring, color bleeding and the like and favored with high printing density, excellent coloring and fixing properties and high scratch resistance can be obtained not only on plain paper or recycled paper but also on all recording mediums such as coated paper. Furthermore, the resistance of the coloring agent against a surfactant or a penetrant such as glycol ethers is improved, whereby on ink composition having excellent storage stability can be obtained and at the same time, the ink composition can have a good quick drying property.

In the fourth embodiment of the recording method of the present invention, anionic polymer fine particles are added to the first ink composition. However, similar effects can be obtained also by adding cationic polymer fine particles to the second ink composition or by adding anionic polymer fine particles and cationic polymer fine particles to the first and second ink compositions, respectively.

In the fourth embodiment of the recording method of the present invention, the ink compositions both comprise "a coloring agent comprising a coloring material enclosed with a polymer having a crosslinked structure". However, similar effects as above can be obtained in other embodiments where one ink composition comprises "a coloring agent comprising a coloring material enclosed with a polymer having an anionic group or a cationic group and having a crosslinked structure" and the other ink composition comprises "a coloring agent comprising a coloring material enclosed with a polymer having an anionic group or a cationic group".

Embodiments of the Ink Set for Ink Jet Recording

In the first embodiment, the ink set for the ink jet recording of the present invention comprises a color ink composition comprising at least a water-soluble organic solvent, water and a coloring agent comprising a coloring material enclosed with a polymer having an anionic group, and a black ink composition comprising at least a water-soluble organic solvent, water and a coloring agent comprising a coloring material enclosed with a polymer having a cationic group.

In a second embodiment of the ink set of the present invention, the color ink composition in the first embodiment of the ink set further comprises anionic polymer fine particles.

That is, the second embodiment of the ink set for the ink jet recording of the present invention comprises a color in composition comprising at least anionic polymer fine particles, a water-soluble organic solvent, water and a coloring agent comprising a coloring material enclosed with a polymer having an anionic group, and a black ink composition comprising at least a water-soluble organic solvent, water and a coloring agent comprising coloring material enclosed with a polymer having a cationic group.

In the second embodiment of the ink set of the present invention, anionic polymer fine particles are added to the color ink composition. Alternatively, cationic polymer fine particles may be added to the black ink composition, or anionic polymer fine particles and cationic polymer fine particles may be added to the color ink composition and the black ink composition, respectively.

In a third embodiment of the ink set for the ink jet recording of the present invention, the polymer having an anionic group for use in the coloring agent of the color ink composition has a crosslinked structure and the polymer having a cationic group for use in the coloring agent of the black ink composition has a crosslinked structure.

That is, the third embodiment of the ink set comprises a color ink composition comprising at least a water-soluble organic solvent, water and a coloring agent comprising a coloring material enclosed with a polymer having an anionic group and having a crosslinked structure, and a black ink composition comprising at least a water-soluble organic solvent, water and a coloring agent comprising a coloring material enclosed with a polymer having a cationic group and having a crosslinked structure.

In a fourth embodiment of the ink set of the present invention, the color ink composition in the third aspect of the ink set further comprises anionic polymer fine particles.

That is, the fourth embodiment of the ink set for the ink jet recording of the present invention comprises a color in composition comprising at least anionic polymer fine particles, a water-soluble organic solvent, water and a coloring agent comprising a coloring material enclosed with a polymer having an anionic group and having a crosslinked structure, and a black ink composition comprising at least a water-soluble organic solvent, water and a coloring agent comprising a coloring material enclosed with a polymer having a cationic group and having a crosslinked structure.

In the fourth embodiment of the ink set of the present invention, anionic polymer fine particles are added to the color ink composition. Alternatively, cationic polymer fine particles may be added to the black ink composition, or anionic polymer fine particles and cationic polymer fine particles may be added to the color ink composition and the black ink composition, respectively.

In the fifth embodiment, the ink set for the ink jet recording of the present invention comprises a color ink composition comprising at least a water-soluble organic solvent, water and a coloring agent comprising a coloring material enclosed with a polymer having an anionic group and having a crosslinked structure, and a black ink composition comprising at least a water-soluble organic solvent, water and a coloring agent comprising a coloring material enclosed with a polymer having a cationic group.

In a sixth embodiment of the ink set, the color ink composition in the fifth embodiment of the ink set further comprises anionic polymer fine particles.

That is, the sixth embodiment of the ink set of the present invention comprises a color ink composition comprising at least anionic polymer fine particles, a water-soluble organic solvent, water and a coloring agent comprising a coloring material enclosed with a polymer having an anionic group and having a crosslinked structure, and a black ink composition comprising at least a water-soluble organic solvent, water and a coloring agent comprising a coloring material enclosed with a polymer having a cationic group.

In the sixth embodiment of the ink set of the present invention, anionic polymer fine particles are added to the color ink composition. Alternatively, cationic polymer fine particles may be added to the black ink composition, or anionic polymer fine particles and cationic polymer fine particles may be added to the color ink composition and the black ink composition, respectively.

In the sixth embodiment of the ink set, the color ink composition comprises a coloring agent comprising a coloring material enclosed with a polymer having an anionic group and having a crosslinked structure, and the black ink composition comprises an coloring agent comprising a coloring material enclosed with a polymer having a cationic group. Alternatively, the ink set may comprise a color ink composition comprising a coloring agent comprising a coloring material enclosed with a polymer having a anionic group, and a black ink composition comprising a coloring agent comprising a coloring material enclosed with a polymer having a cationic group and having a crosslinked structure. Also in this ink set, anionic polymer fine particles and/or cationic polymer fine particles may be added to the color ink composition and/or the black ink composition, respectively.

In the seventh embodiment, the ink set for the ink jet recording of the present invention comprises a color ink composition comprising at least a water-soluble organic solvent, water and a coloring agent comprising a coloring material enclosed with a polymer having a cationic group, and a black ink composition comprising at least a water-soluble comprising a coloring material enclosed with a polymer having an anionic group.

In a eighth embodiment of the ink set of the present invention, the color ink composition in the seventh embodiment of the ink set further comprises cationic polymer fine particles.

That is, the eighth embodiment of the ink set of the present invention comprises a color ink composition comprising at least cationic polymer fine particles, a water-soluble organic solvent, water and a coloring agent comprising a coloring material enclosed with a polymer having a cationic group, and a black ink composition comprising at least a water-soluble organic solvent, water and a coloring agent comprising a coloring material enclosed with a polymer having an anionic group.

In the sixth embodiment of the ink set of the present invention, cationic polymer fine particles are added to the color ink composition. Alternatively, anionic polymer fine particles may be added to the black ink composition, or anionic polymer fine particles and anionic polymer fine particles may be added to the color ink composition and the black ink composition, respectively.

In a ninth embodiment, the ink set for the ink jet recording of the present invention comprises a color ink composition comprising at least a water-soluble organic solvent, water and a coloring agent comprising a coloring material enclosed with a polymer having a cationic group and having a crosslinked structure, and a black ink composition comprising at least a water-soluble organic solvent, water and a coloring agent comprising a coloring material enclosed with a polymer having an anionic group and having a crosslinked structure.

In the tenth embodiment of the ink set of the present invention, the color ink composition in the ninth embodiment of the ink set further comprises cationic polymer fine particles.

That is, the tenth embodiment of the ink set of the present invention comprises a color in composition comprising at least cationic polymer fine particles, a water-soluble organic solvent, water and a coloring agent comprising a coloring material enclosed with a polymer having a cationic group and having a crosslinked structure, and a black ink composition comprising at least a water-soluble organic solvent, water and a coloring agent comprising a coloring material enclosed with a polymer having an anionic group and having a crosslinked structure.

In the tenth embodiment of the ink set of the present invention, cationic polymer fine particles are added to the color ink composition. Alternatively, anionic polymer fine particles may be added to the black ink composition, or cationic polymer fine particles and anionic polymer fine particles may be added to the color ink composition and the black into composition, respectively.

In an eleventh embodiment, the ink set for ink jet recording of the present invention comprises a color ink composition comprising at least a water-soluble organic solvent, water and a coloring agent comprising a coloring material enclosed with a polymer having a cationic group and having a crosslinked structure, and a black ink composition comprising at least a water-soluble organic solvent, water and a coloring agent comprising a coloring material enclosed with a polymer having an anionic group.

In a twelfth embodiment of the ink set of the present invention, the color ink composition in the eleventh embodiment of the ink set further comprises cationic polymer fine particles.

That is, the twelfth embodiment of the ink set of the present invention comprises a color ink composition comprising at least cationic polymer fine particles, a water-soluble organic solvent, water and a coloring agent comprising a coloring material enclosed with a polymer having a cationic group and having a crosslinked structure, and a black ink composition comprising at least a water-soluble organic solvent, water and a coloring agent comprising a coloring material enclosed which a polymer having an anionic group.

In the twelfth embodiment of the ink set of the present invention, cationic polymer fine particles are added to the color ink composition. Alternatively, anionic polymer fine particles may be added to the black ink composition, or cationic polymer fine particles and anionic polymer fine particles may be added to the color ink composition and the black ink composition, respectively.

In the twelfth embodiment of the ink act, the color ink composition comprises a coloring agent comprising a coloring material enclosed with a polymer having a cationic group and having a crosslinked structure, and the black ink composition comprises a coloring agent comprising a coloring material enclosed with a polymer having an anionic group. Alternatively, the ink set may comprise a color ink composition comprising a coloring agent comprising a coloring material enclosed with a polymer having a cationic group, and a black ink composition comprising a coloring agent comprising a coloring material enclosed with a polymer having an anionic group and having a crosslinked structure. Also in this ink set, anionic polymer fine particles and/or cationic, polymer fine particles may be added to the color ink composition and/or the black ink composition, respectively.

DETAILED DESCRIPTION OF THE PRESENT INVENTION

The present invention is described in greater detail below.

The term "enclosed" used herein means such a state that the coloring material is completely surrounded by a polymer.

In respective embodiments, the anionic group of a polymer, having enclosed therewith a coloring material, of the coloring agent is selected from the group consisting of a sulfone group, a sulfonic acid group, a phospho group, a carboxyl group, a carbonyl group and salts thereof.

Furthermore, in respective embodiments, the cationic group of a polymer, having enclosed therewith a coloring material, of the coloring agent is selected from the group consisting of a primary fatty amine salt, a secondary fatty amine salt, a tertiary fatty amine salt and a quaternary ammonium salt.

Examples of the polymer include a vinyl-type polymer, a poly(meth)acrylic acid ester, a styrene-(meth)acrylic acid copolymer, polyester, polyamide, polymide, polyurethane, an amino type polymer, a silicon-containing polymer, a sulfur-containing polymer, a fluorine-containing polymer, an epoxy-type resin and a mixture thereof.

The coloring agent comprising a coloring material enclosed with a polymer having an anionic group can be obtained by dispersing a coloring material in water using a dispersant having an anionic group and a polymerizable group and then emulsion-polymerizing the dispersion at least together with a copolymerizable monomer in the presence of a polymerization initiator. The coloring agent obtained by the emulsion-polymerization in spherical and the particles are uniform in the particle size, so that the ink viscosity can be reduced and moreover, a Newton viscosity or a behavior close thereto can be easily obtained.

The dispersant having an anionic group and a polymerizable group, which can be used, is obtained by introducing an anionic group and a polymerizable group into a synthetic polymer described below.

Specific examples of the synthetic polymer include polyvinyl alcohols; polyvinyl pyrrolidones; acryl-base resins such as polyacrylic acid, acrylic acid-acetonitrile copolymer, potassium acrylate-acetonitrile copolymer, vinyl acetate-acrylic acid ester copolymer and acrylic acid-acrylic acid ester copolymer; styrene-acrylic resin copolymers such as styrene-acrylic acid copolymer, styrene-methacrylic acid copolymer, styrene-methacrylic acid-acrylic acid ester copolymer, styrene-(($\alpha$-methylstyrene)-acrylic acid copolymer and styrene-($\alpha$-methylstyrene)-acrylic acid-acrylic acid ester copolymer; styrene-maleic acid copolymer, styrene-maleic anhydride copolymer, vinyl naphthalene-acrylic acid copolymer, vinylnaphthalene-maleic acid copolymer; vinyl acetate-base copolymers such as vinyl acetate-ethylene copolymer, vinyl acetate-fatty vinyl ethylene copolymer, vinyl acetate-maleic acid ester copolymer, vinyl acetate-orogenic acid copolymer and vinyl acetate-acrylic acid copolymer; and salts thereof. Among these, a copolymer of a monomer having a hydrophobic group and a monomer having a hydrophilic group, and a polymer comprising a monomer having both a hydrophobic group and a hydrophilic group within the molecule structure are preferred.

Examples of the anionic group include a sulfolane group, a sulfonic acid group, a phosphor group, a carboxyl group, a carbonyl group, a thiocarboxyl group and salts thereof.

The polymerizable group may be any functional group insofar as it causes a polymerization reaction such as radical polymerization, polyaddition reaction or polycondensation reaction. Examples of the radical polymerizable group include an unsaturated hydrocarbon group such as vinyl group, allyl group, acryloyl group, methacryloyl group, vinylidene group and vinylene group. Examples of the polyaddition reactive group include an isocyanate group and an isothiocyanate group and examples of the group which reacts with an isocyanate group or an isothiocyanate group include a hydroxyl group, an amino group, a mercapto group and a carboxyl group. Examples of the polycondensation reactive group include a functional group capable of undergoing a condensation reaction, such as carboxyl group, hydroxyl group, amino group and alkoxy group.

In a preferred embodiment of the present invention, the polymerizable group is preferably an unsaturated hydrocarbon group which is a radical polymerizable group, and the unsaturated hydrocarbon group is preferably selected from the group consisting of a vinyl group, an allyl group, an acryloyl group, a methacryloyl group, a propenyl group, a vinylidene group and a vinylene group.

In a preferred embodiment of the present invention, the dispersant having a polymerizable group is preferably a polymerizable surfactant. The polymerizable surfactant has a hydrophobic group, a hydrophilic group and a polymerizable group within the molecule. The hydrophilic group has at least an anionic group selected from the group consisting of a sulfolane group, a sulfonic acid group, a phosphor group, a carboxyl group, a carbonyl group, a thio carboxyl group and salts thereof. The polymerizable group is an unsaturated hydrocarbon group, more specifically, the unsaturated hydrocarbon group is preferably selected from the group consisting of a vinyl group, an allyl group, an acryloyl group, a methacryloyl group, a propenyl group, a vinylidene group and a vinylene group. Specific examples of the polymerizable surfactant include anionic allyl derivatives described in JP-B-49-46291, JP-B-1-24142 and JP-A-62-104802; anionic propenyl derivatives described in JP A 62-221431; anionic acrylic acid derivatives described in JP-A-62-34947 and JP-A-55-11525; anionic itaconic acid derivatives described in JP-B-46-34898 and JP-A-51-30284; anionic maleic acid derivatives described in JP-B-51-4157 and JP-A-51-30284; nonionic allyl derivatives described in JP-A-b62-104802; nonionic propenyl derivatives described in JP-A-62-100502; nonionic acrylic acid derivative* described in JP-A-56-28208; nonionic itaconic acid derivatives described in JP-B-59-12681; and nonionic maleic acid derivatives described in JP-A-59-74102.

The polymerizable surfactant adsorbs to the surface of a coloring material particle and exhibits excellent dispersion stability (namely, can prevent aggregation of particles to each other) even under the conditions of later polymerization and therefore, this surfactant is advantageous in that the formation of capsulated particles is facilitated.

In the prevent invention, the polymerizable surfactant is preferably a compound represented by the following formula (I) or (II).

The polymerizable surfactant represented by formula (I) is disclosed in JP-A-5-320276 and JP-A-10-316909.

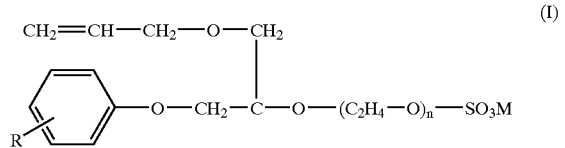

wherein R represents a hydrogen atom or a hydrocarbon group having from 1 to 12 carbon atoms, n represents a number of 2 to 20, and M represents an alkali metal, an ammonium salt or an alkanolamine.

By appropriately adjusting R and the value of n in formula (1), the polymerizable surfactant can be rendered corresponding to the degree of hydrophilicity or hydrophobicity on the surface of the coloring material. Specific examples of preferred polymerizable surfactants represented by formula (I) include the compounds represented by the following formula (III) to (VI). These compounds may be used individually or as a mixture of two or more thereof.

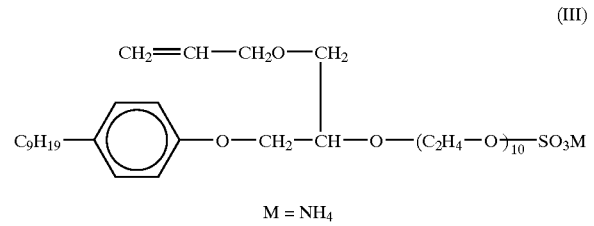

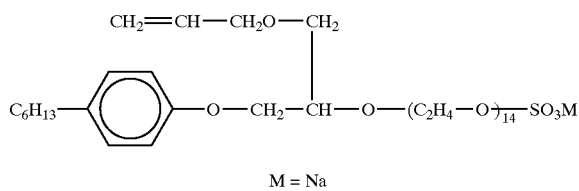

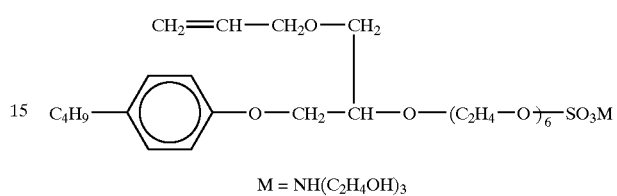

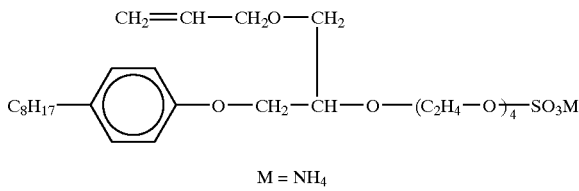

The polymerizable surfactant of formula (I), which can be used, may be a commercially available product. For example, ADEKA REASOAP SE-series SE-10N produced by Asahi Denka Kogyo K. K. is a case where R is $C_9H_{19}$, n is 10 and M is $NH_4$, and this comes under formula (III). SE-20N is a case where n of SE-10N is 20.

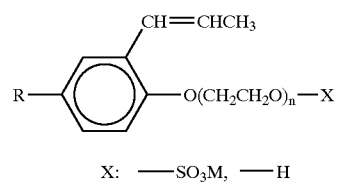

wherein R represents a hydrogen atom or a hydrocarbon group having from 1 to 12 carbon atoms, n represents a number of 2 to 20, and M represents an alkali metal, an ammonium salt or an alkanol amine.

In a preferred embodiment of the present invention, fine and stable capsulated particles are used, which are obtained by embracing a coloring material in A polymer of a polymerizable surfactant represented by formula (I) or (II) and a monomer copolymerizable with the polymerizable surfactant. In another preferred embodiment of the present invention, fine and stable capsulated particles are used, which are obtained by embracing a coloring material in a polymer of a polymerizable surfactant represented by formula (I) or (II), a monomer copolymerizable with the polymerizable surfactant, and a crosslinkable monomer.

The fine and stable capsulated particles containing a coloring material are stably dispersed particularly in an aqueous medium. The polymerizable surfactant represented by formula (I) or (II) has excellent adsorptivity to the surface of coloring material particle and high dispersion stability (that is, can prevent aggregation of particles with each other) under the conditions of later polymerization and therefore, is advantageous in that the formation of capsulated particles is facilitated.

Other than the above-described commercially available products, examples of the polymerizable surfactant which can be used include AQUARON HS-series (AQUARON HS-05, HS-10, HS-20, HS-1025), AQUARON RN-series (RN-10, RN-20, RN-30, RN-50, RN-2025) and NEW FRONTIER-series (NEW FRONTIER N-177E, S-510) produced by Daiichi Kogyo Yakuhin Co. Ltd., and ADEKA REASOAP NE-series (NE-10, NE-20, NE-30, NE-40, NE-50) produced by Asahi Denka Kogyo K. K.

The amount of the polymerizable surfactant added is preferably on the order of 10 to 150% by weight, more preferably on the order of 20 to 100% by weight, based on the coloring material With the amount added of 10% or more, the ink composition can be improved in the dispersion stability, and with the amount added of 150% or less, the generation of polymerizable surfactant not adsorbed to the coloring material and the generation of polymer other than the capsulated particles can be prevented, as a result, the ink composition can have good election stability.

The crosslinkable monomer for use in the present invention may be any crosslinkable monomer insofar as it has high copolymerizability with the polymerizable surfactant.

The copolymerizable monomer which can be used is a generally employed radical polymerizable monomer. Examples thereof include monomers having a radical polymerizable group, for example, styrene and styrene derivatives such as methyl styrene, dimethyl styrene, chlorostyrene, dichlorostyrene bromostyrene, P-chloromethylstyrene and divinylbenzene; monofunctional acrylic acid esters such as methyl acrylate, ethyl acrylate, n-butyl acrylate, butoxyethyl acrylate, benzyl acrylate, phenyl acrylate, phenoxyethyl acrylate, cyclohexyl acrylate, dicyclopentanyl acrylate, dicyclopentenyl acrylate, dicyclopentenyloxyethyl acrylate, tetrahydrofurfuryl acrylate, isobornyl acrylate, 2-hydroxyethyl acrylate, 2-hydroxypropyl acrylate, caprolactone acrylate and glycidyl acrylate; monofunctional methacrylic acid esters such as methyl methacrylate, ethyl methacrylate, n-butyl methacrylate, 2-ethylhexyl methacrylate, butoxymethyl methacrylate, benzyl methacrylate, phenyl methacrylate, phenoxyethyl methacrylate, cyclohexyl methacrylate, dicyclopentanyl methacrylate, dicyclopentanyl methacrylate, dicyclopentenyloxyethyl methacrylate, tetrahydrofurfuryl methacrylate, isobornyl methacrylate, 2-hydroxyethyl methacrylate, 2-hydroxypropyl methacrylate, 2-hydroxybutyl methacrylate, glycerol methacrylate, caprolactone methacrylate and glycidyl methacrylate; allyl compounds such as allylbenzene, allyl-3-cyclohexane propionate, 1-allyl-3,4-dimethoxybenzene, allylphenoxy acetate, allylphenyl acetate allylcyclohexane and polyhydric allyl carboxylate; esters such as fumaric acid, maleic acid and itaconic acid; acetonitrile, methacrylonitrile, N-substituted maleimide and cyclic olefin.

Since the polymerizable surfactant represented by formula (I) is a monomer having high electron-donating property, the monomer used is preferably a monomer having high electron acceptability. Specific examples of the monomer having high electron acceptability include fumaric acid diesters such as acetonitrile, fumaronitrile and dibutyl fumarate; maleic acid diesters such as dibutyl maleate; maleimides such as N-phenylmaleimide; and vinylidene cyanide. These may be used individually or as a mixture of two or more thereof.

The amount of the monomer added is, in terms of the molar ratio, preferably on the order of 2 to 15, more preferably on the order of 3 to 12, based on the polymerizable surfactant. With the amount added of 2 or more in terms of the molar ratio, the formed coloring material capsule particle can have excellent dispersion stability in an aqueous medium, and with the amount added of 15 or less in terms of the molar ratio, the monomer can be sufficiently dissolved in the adsorption layer formed by the polymerizable surfactant and the generation of water-insoluble polymer or the relative reduction of ionic repulsive group can be inhibited, as a result, the ink composition can be elevated in the dispersion stability.

For introducing an anionic group into the polymer, a copolymerizable monomer having an anionic group is preferably used. For instance, examples of the acryl monomer having a carboxyl group include an acrylic acid, a methacrylic acid, a crotonic acid, an ethylacrylic acid, propylacrylic acid, isopropylacrylic acid, itaconic acid and fumaric acid. Among these, an acrylic acid and a methacrylic acid are preferred. Examples of the (meth)acryl monomer having a sulfonic acid group include sulfoethyl methacrylate, butylacrylamidesulfonic acid and 2-acrylamide-2-methylpropanesulfonic acid. Examples of the (meth)acryl monomer having a phosphor group include phosphoethyl methacrylate.

The polymerization initiator used is a water-soluble polymerization initiator of inorganic peracid salt such as potassium persulfate, ammonium persulfate, sodium persulfate, potassium of and sodium perborate.

For the purpose of adjusting the polymerization degree of the polymer, a polymerization controlling agent such as mercaptan, disulfide and diazothioether may also be used.

The color agent comprising a coloring material enclosed with a polymer having an anionic group and having a crosslinked structure according to another embodiment or the present invention can be obtained by dispersing a coloring material in water using a dispersant having an anionic group and a polymerizable group and then emulsion-polymerizing the dispersion at least together with a monomer copolymerizable with the polymerizable surfactant and a crosslinkable monomer in the presence of a polymerization initiator.

The dispersant having introduced thereinto an anionic group and a polymerizable group, which can be used, is the same as the dispersant described above. Also in this embodiment, a polymerizable surfactant is preferably used as the dispersant having a polymerizable group. The polymerizable surfactant which can be used is the same as the polymerizable surfactant described above. The copolymerizable monomer which can be used is also the same as the copolymerizable monomer described above.

The crosslinkable monomer is preferably a (meth)acrylic acid ester monomer having a crosslinking reactive group. Examples thereof include polymerizable monomers having a block isocyanate group, monomers having an epoxy group, and monomers having a 1,3-dioxoran-2-one-4-yl group. The polymerizable monomer having a block isocyanate group can be easily obtained by addition-reacting a known block agent to a polymerizable monomer having an isocyanate group such as 2-methacryloyloxoethyl isocyanate.

The polymerizable monomer having a block isocyanate group may also be produced by addition-reacting compound having an isocyanate group and a block isocyanate group to a vinyl-based copolymer having a hydroxyl group and a carboxyl group. Examples of the monomer having an epoxy group include glycidyl (meth)acrylate and a (meth)acrylate monomer having an alicyclic epoxy group. Example of the monomer having a 1,3-dioxoran-2-one-4-yl group include 1,3-dioxoran-2-one-4-ylmethyl (meth)acrylate and 1,3-dioxoran-2-one-4-ylmethyl vinyl ether.

In the case where the crosslinking reactive group of the polymer is a glycidyl group, a compound having two or more functional group which are at least one functional group selected from the group consisting of an amino group, a carboxyl group, a hydroxyl group, an N-methylol group and an N-methylolether group is preferably used, and examples thereof include aliphatic amines such as ethylene amine, N-aminoethylpiperazine, methaxylenediamine, 1,3bis(amino-methyl)cyclohexane and polyamide; cyclic aliphatic amines such as paramenthanediamine, mesophoronediamine, bis(4-amino-3-methylcyclohexyl) methane and 2-ethyl-4-methyl-imidazole; aromatic amines such as methaphenylenediamine, 4,4'-diaminodiphenylamine, 4,4'-diaminodiphenylsulfone and dicyandiamide; and acid anhydrides such as phthalic anhydride, pyromellitic anhydride and nadic anhydride.

In the case where the crosslinking reactive group of the polymer is an isocyanato group, a compound having two or more functional groups which are at least one functional group selected from the group consisting of a carboxyl group, a hydroxyl group, an amino group and a mercapto group is preferably used, and examples thereof include polyols such as polyether polyol, polytetramethylene ether glycol, alkylene oxide-copolymerized polyol, epoxy resin-modified polyol, lactone-based polyester polyol, condensation-type polyester polyol, polycarbonate diol, acrylic polyol, polybutadiene polyol, phosphorous-containing polyol and halogen containing polyol; polyamines such as polyether polyamine, polytetramethylene ether diamine, alkylene oxide-copolymerized polyamine, epoxy-modified polyamine, polyamine, condensation-type polyester polyamine, polycarbonate polyamine and acrylic polyamine; and polythiols such as polyether polythiol, polytetramethylene ether dithiol, alkylene oxide-copolymerized polythiol, epoxy resin-modified polythiol, lactone-based polyester polythiol, condensation-type polyether polythiol, polycarbonate dithiol, acrylic polythiol, polybutadiane polythiol, phosphorous-containing polythiol and halogen-containing polythiol.

In the case where the (crosslinking reactive group of the polymer is a hydroxyl group, a compound having two or more functional groups which are at least one compound selected from the group consisting of a glycidyl group and an isocyanate group is preferably used.

In the case where the crosslinking reactive group of the polymer is an unsaturated hydrocarbon group, a compound having two or more unsaturated hydrocarbon groups which are at least one unsaturated hydrocarbon group selected from the group consisting of a vinyl group, an allyl group, an acryloyl group, a methacryloyl group, a propenyl group, a vinylidene group and a vinylene group is preferably used, and example thereof include ethylene glycol diacrylate, diethylene glycol diacrylate, triethylene glycol diacrylate, tetraethylene glycol diacrylate, polyethylene glycol diacrylate, allyl acrylate, bis(acryloxyethyl)hydroxyethyl isocyanurate, bis(acryloxyneopentyl glycol) adipate, 1,3-butyrene glycol diacrylate, 1,6-hexanediol diacrylate, neopentyl glycol diacrylate, propylene glycol diacrylate, polypropylene glycol diacrylate, 2-hydroxy-1,3-diacryloxypropane, 2,2-bis[4-(acryloxy)phenyl]propane, 2,2-bio[4-(acryloxyethoxy)phenyl]propane, 2,2-bis [4-(acryloxyethoxy.diethoxy)phenyl]propane, 2,2-bis [4-(acryloxyethoxy.polyethoxy)phenyl]propane, neopentyl glycol hydroxypivalate diacrylate, 1,4-butanediol diacrylate, dicyclopentanyl diacrylate, dipentaerythritol hexaacrylate, dipentaerythritol monohydroxy pentaacrylate, ditrimethylolpropane tetraacrylate, pentaerythritol triacrylate, tetrabromobisphenol A diacrylate, triglycerol diacrylate, trimethylolpropane triacrylate, tris(acryloxyethyl)isocyanurate, ethylene glycol dimethacrylate, diethylene glycol dimethacrylate, triethylene glycol dimethacrylate, tetraethylene glycol dimethacrylate, polyethylene glycol dimethacrylate, propylene glycol dimethacrylate, polypropylene glycol dimethacrylate, 1,3-butylene glycol dimethacrylate, 1,4-butanediol dimethacrylate, 1,6-hexanediol dimethacrylate, neopentyl glycol dimethacrylate, 2-hydroxy-1,3-dimethacryloxypropane, 2,2-bis[4-(methacryloxy)phenyl]propane, 2,2-bis [4-(methacryloxyethoxy)phenyl]propane, 2,2-bis[4-(methacryloxydiethoxy)phenyl]propane, 2,2bis[4-(methacryloxyethoxypolyethoxy)phenyl]propane, tetrabromobisphenol A dimethacrylate, dicyclopentanyl dimethacrylate, dipentaerythritol hexamethacrylate, glycelol dimethacrylate, neopentyl glycol hydroxypivalate dimethacrylate, dipentaerythritol monohydroxy pentamethacrylate, ditrimethylolpropane tetramethacrylate, pentaerythritol trimethacrylate, pentaerythritol tetramethacrylate, triglycelol dimethacrylate, trimethylolpropane trimethacrylate, tris(methacryloxyethyl) isocyanurate, allyl methacrylate, divinylbenzene, diallyl phthalate, diallyl terephthalate, diallyl isophthalate and diethylene glycol bisallyl carbonate.

The amount of the crosslinkable monomer added is, in terms of the constitutional ratio of the inclusion polymer, preferably from 0.1 to 50% by weight, more preferably from 0.1 to 10% by weight. If the amount added is less than 0.1% by weight, elevation of viscosity, clogging of nozzle or failure in ejection stability may disadvantageously occur on use in combination with a penetrant such as glycol other for a long period of time, whereas if it exceeds 50% by weigh, the objective coloring agent may not be obtained and this is not preferred.

The coloring agent comprising a coloring material enclosed with a polymer having a cationic group can be obtained by dispersing a coloring material in water using a dispersant having a cationic group and a polymerizable group and then emulsion polymerizing the dispersion at least together with a monomer (copolymerizable monomer) copolymerizable with the polymerizable surfactant in the presence of a polymerization initiator.

The dispersate having cationic group and a polymerizable group which can be used is a dispersant obtained by introducing a cationic group and a polymerizable group into a synthetic polymer described below. Specific examples of the synthetic copolymer are the same as those described above for the synthetic copolymer having an anionic group and a polymerizable group. Similarly to the above-described dispersant having an anionic group and a polymerizable group, the dispersant having a cationic group and a polymerizable group is preferably a copolymer of a monomer having a hydrophobic group and monomer having a hydrophilic group, or a polymer comprising a monomer having both a hydrophobic group and a hydrophilic group within the molecule structure. Examples of the cationic group include primary fatty amine salts, secondary fatty amine salts, tertiary fatty amine salts and quaternary ammonium salts.

The polymerizable group may be any functional group insofar as it causes a polymerization reaction such as radical polymerization, polyaddition reaction or polycondensation reaction. Specific examples thereof are the same as those described above for the dispersant having an anionic group and a polymerizable group.

In a preferred embodiment, the dispersant having a polymerizable group is preferably a polymerizable surfactant.

The polymerizable surfactant used has a hydrophobic group, a hydrophilic group and a polymerizable group within the molecule, where the hydrophilic group preferably has at least a cationic group selected from the group consisting of a primary fatty amine salt, a secondary fatty amine salt, a tertiary fatty amine salt and a quaternary ammonium salt, and at the same time, an unsaturated hydrocarbon group selected from the group consisting of a vinyl group, an allyl group, an acryloyl group, a methacryloyl group, a propenyl group, a vinylidene group and a vinylene group.

Specific examples of such the polymerizable surfactant include, in addition to the cationic allyl acid derivatives described in JP-B-4-65824, 2 hydroxy-3-methacryloxypropyltrimethylammonium chloride, dimethylaminoethylmethylchloride methacrylate and dimethylaminoethylbenzylchloride methacrylate.

As described above, the polymerizable surfactant absorbs to the surface of a coloring material particle and exhibits excellent dispersion stability (namely, can prevent aggregation of particles to each other) even under the conditions of later polymerization and therefore, this surfactant is advantageous in that the formation of capsulated particles is facilitated.

The amount of the polymerizable surfactant added is preferably on the order of 10 to 150% by weight, more preferably on the order of 20 to 100% by weight, based on the coloring material. With the amount added of 10% or more, the ink composition can be improved in the dispersion stability, and with the amount added of 150% or less, the generation of polymerizable surfactant not adsorbed to the coloring material and the generation of polymer other than the capsule particles can be prevented, as a result, the ink composition can have good ejection stability.

The copolymerizable monomer which can be used is a commonly employed radical polymerizable monomer, similarly to the copolymerizable monomer used in the production or the above-described coloring agent comprising a coloring material enclosed with a polymer having an anionic group.

In order to introduce a cationic group into the polymer, a copolymerizable monomer having a cationic group selected from the group consisting of a primary fatty amino salt, a secondary fatty amine salt, a tertiary fatty amine salt and a quaternary fatty amine salt is preferably used. Examples thereof include N,N'-dimethylacrylamide, N,N'-dimethylaminoethyl acrylate, N,N'-dimethylaminoethyl methacrylate, N,N'-diethylaminoethyl methacrylate, N,N'-dimethylaminopropylacrylamide, dimethylaminoethylmethylchloride methacrylate and dimethylaminoethylmethylchloride methacrylate.

The amount of the monomer added is, in terms of the molar ratio to the polymerizable surfactant, preferably on the order of 2 to 15, more preferably on the order of 3 to 12. With the amount added of 2 or more in term of the molar ratio, the formed capsule coloring material particle can have excellent dispersion stability in an aqueous medium, and with the amount added of 15 or less in terms of the molar ratio, the monomer can be sufficiently dissolved in the adsorption layer of the polymerizable surfactant and the generation of water-insoluble or the relative reduction of ionic repulsive group can be inhibited, as a result, the ink composition can be elevated in the dispersion stability.

The polymerization initiator which can be used may be any water-soluble radical polymerization initiator such as 2,2'-azobis(2-methylpropionamidine)dihydrochloride, 2,2'-azobis(2-amidionopropane)dihydrochloride, 2,2'-azobis[2-(5-methyl-2-imidazolin-2-yl)propane]dihydrochloride, 2,2'-azobis[2-(2-imidazolin-2-yl)propane]dihydrochloride, 2,2'-azobis{2-methyl-N-[1,1-bis(hydroxymethyl)-2-hydroxyethyl]-propionamide}, 2,2'-azobis[2-methyl-N-(2-hydroxyethyl)-propionamide] or 4,4'-azobis(4-cyanovaleric acid). The amount of the catalyst added may be appropriately selected.

For the purpose of adjusting the polymerization degree of the polymer, a polymerization controlling agent such as mercaptan, disulfide and diazothioether may also be used.

The color agent comprising a coloring material enclosed with a polymer having a cationic group and having a crosslinked structure according to another embodiment of the present invention can be obtained by dispersing a coloring material in water using a dispersant having a cationic group and a polymerizable group and then emulsion-polymerizing the dispersion at least together with a monomer copolymerizable with the polymerizable surfactant and a crosslinkable monomer in the presence of a polymerization initiator.

The dispersant having introduced thereinto a cationic group and a polymerizable group, which can be used, is the same as the dispersant described above. Also in this embodiment, a polymerizable surfactant is preferably used as the dispersant having a polymerizable group. The polymerizable surfactant has a hydrophobic group, a hydrophilic group and a polymerizable group within the molecule, similarly to the polymerizable surfactant described above. In the polymerizable surfactant which can be used, the hydrophilic group has at least a cationic group selected from the group consisting of a primary fatty amine salt, a secondary fatty amine salt, tertiary fatty amine salt and a quaternary ammonium salt, and at the same time, an unsaturated hydrocarbon group selected from the group consisting of a vinyl group, an allyl group, a acryloyl group, a methacryloyl group, a propenyl group, a vinylidene group and a vinylene group. The copolymerizable monomer which can be used is also the same as the copolymerizable monomer described above.

The crosslinkable monomer is preferably a (meth)acrylic acid ester monomer having a crosslinking reactive group. Examples of the (meth)acrylic acid ester monomer having a crosslinking reactive group, which can be used, are the same as those described above.

The amount of the crosslinkable monomer added is, in terms of the constitutional ratio of the inclusion polymer, preferably from 0.1 to 50% by weight, more preferably from 0.1 to 10% by weight. If the amount added is less than 0.1% by weight, elevation of viscosity, clogging of nozzle or failure in ejection stability may disadvantageously occur on use in combination with a penetrant such as glycol ether for a long period of time, whereas if it exceeds 50% by weigh, the objective coloring agent may not be obtained and this is not preferred.

The coloring material used in the present invention is an oil-soluble dye or a pigment.

The oil-soluble dye used in the present invention is a disperse dye, a vat dye, an organic solvent dissolution dye or the like.

The pigment for use in the present invention is not particularly limited and either an inorganic pigment or an organic pigment may be used.

Examples of the inorganic pigment which can be used include titanium oxide, iron oxide and carbon black such as furnace black, lamp black, acetylene black and channel black. Example of the organic pigment which can be used include azo pigments (including azo lake, insoluble azo pigment, condensation azo pigment and chelate azo pigment), polycyclic pigments (e.g., phthalocyanine pigment, perylene pigment, perinone pigment, anthraquinone pigment, quinacridone pigment, dioxane pigment, thioindigo pigment, isoindolinone pigment, quinofuranone pigment), dye chelates (e.g., basic dye type chelate, acidic dye-type chelate), nitro pigments, nitroso pigments and aniline black.

More specifically, examples of the pigment which is used as black ink include the following carbon black. That is, No. 2300, No. 900, MCF88, No. 33, No. 40 , No. 45, No. 52, MA 7, MA 8, MA 100 and No. 2200B produced by Mitsubishi Chemical Co. Ltd.; Raven 5750, Raven 5250, Raven 5000, Raven 3500, Raven 1255 and Raven 700 produced by Columbia; Regal 400R, Regal 330R, Regal 660R, Mogul L, Monarch 700, Monarch 800, Monarch 880, Monarch 900, Monarch 1000, Monarch 1100, Monarch 1300 and Monarch 1400 produced by Cabot; Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4 produced by Degussa can be used.

Examples of the pigment used for yellow ink include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 128, C.I. Pigment Yellow 129, C.I. Pigment Yellow 138, C.I. Pigment Yellow 151, C.I. Pigment Yellow 154, C.I. Pigment Yellow 155, C.I. Pigment Yellow 180 and C.I. Pigment Yellow 185.

Examples of the pigment used for megenta ink include C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 57:1, C.I. Pigment Red 112, C.I. Pigment Red 123, C.I. Pigment Red 168, C.I. Pigment Red 184, and C.I. Pigment Red 202.

Examples of the pigment used for cyan ink include C.I. Pigment Blue 1, C.I. Pigment Blue 2, C.I. Pigment Blue 3, C.I. Pigment Blue 15:3, C.I. Pigment Blue 15:34, C.I. Pigment Blue 16, C.I. Pigment Blue 22, C.I. Pigment Blue 60, C.I. Vat Blue 4 and C.I. Vat Blue 60.

Although not limited, the black ink is preferably carbon black, the cyan ink is preferably C.I. Pigment Blue 15:3, the magenta ink is preferably C.I. Pigment Red 122, and the yellow ink is preferably one or more pigment selected from the group consisting of C.I. Pigment Yellow 73, C.I. Pigment Yellow 109, C.I. Pigment Yellow 110, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 180 and C.I. Pigment Yellow 185.

The coloring agent comprising a pigment enclosed with a polymer produced from a polymerizable surfactant and a monomer copolymerizable with the polymerizable surfactant can be produced as follows.

In the immobilization of the polymerizable surfactant to a pigment, namely, in the capsulation of a pigment, the pigment and the polymerizable surfactant are added to an aqueous organic solvent and/or water and wet pulverized in a disperser such as ultrasonic wave, ball mill or sand grinder. Thereafter, a copolymerizable monomer and a polymerization initiator are added while continuing the pulverization treatment, it desired, and the polymerization reaction is performed at 40 to 100° C. for 10 to 60 hours, thereby obtaining capsulated pigment particles comprising a pigment enclosed with a polymer. The amount of the polymerization initiator added is preferably from 0.1 to 10% by weight, more preferably from 1 to 5% by weight, based on the monomer. The capsulated pigment particles are more preferably produced in accordance with the production method described in JP-A-10-316909.

Also in the case of an oil soluble dye, the capsulated coloring material particles comprising an oil-soluble dye enclosed with a polymer can be obtained in the same manner as above.

The coloring agent comprising a pigment enclosed with a polymer having a crosslinked structure obtained from a polymerizable surfactant, a monomer (copolymerizable monomer) copolymerizable with the polymerizable surfactant and a crosslinkable monomer, according to another embodiment of the present invention, can be produced as follows.

In the immobilization of a polymerizable surfactant to a pigment, namely, in the capsulation of a pigment, the pigment and the polymerizable surfactant are added to an aqueous organic solvent and/or water and wet pulverized in a disperser such as ultrasonic wave, ball mill or sand grinder. Thereafter, other copolymerizable monomer and polymerization initiator are added while continuing the pulverization treatment, if desired, and the polymerization reaction is performed at 40 to 100° C. for 10 to 60 hours, thereby obtaining capsulated pigment particles comprising a pigment enclosed with a polymer having a crosslinked structure. The amount of the polymerization initiator added is preferably from 0.1 to 10% by weight, more preferably from 1 to 5% by weight based on the monomer. The capsulated pigment particles are more preferably produced in accordance with the production method described in JP-A-10-316909.

Also in the case of an oil-soluble dye, the capsulated coloring material particles comprising an oil-soluble dye enclosed with a polymer having a crosslinked structure can be obtained in the same manner as above.

The immobilization of a polymerizable surfactant to a pigment, namely, the capsulation of a pigment can also be performed in accordance with the above-described production process.

The amount added of the coloring agent for use in the present invention is preferably from 0.5 to 30% by weight, more preferably from 1.0 to 12% by weight. If the amount added is less than 0.5% by weight, a sufficiently high printing density cannot be ensured, whereas if the amount added exceeds 30% by weight, the ink is liable to suffer from the increase in the viscosity or deterioration of the ejection stability and this is not preferred. The particle size of the coloring agent is preferably 400 nm or less, more preferably 200 nm or less.

The polymer fine particle for use in the present invention is a fine particle of the polymer component. The polymer fine particle is preferably used in the form of an aqueous dispersion solution where the continuous phase is water and the dispersion particle is the polymer fine particle. This aqueous dispersion solution is sometimes called "polymer emulsion", "water-based emulsion", "aqueous emulsion", "latex", "resin emulsion" or "micro-emulsion".

In the present invention, the polymer fine particle used together with the coloring agent comprising a coloring material enclosed with a polymer having an anionic group may have either a single particle structure or a multilayer structure such as core-shell structure, and has an anionic group on the surface thereof, such as a sulfolane group, a sulfonic acid group, a carboxyl group, a carbonyl group, a salt thereof, and a hydroxyl group. The polymer fine particle used together with a coloring agent comprising a coloring material enclosed with a polymer having a cationic group may also have either a single particle structure or a multilayer structure such as core-shell structure, and has a cationic group on the surface thereof, such as a primary fatty amine salt, a secondary fatty amine salt, a tertiary fatty amine salt and a quaternary ammonium salt. In the case of the core-shell structure, the above-described functional group is preferably present in the shell layer. In the production method described later, this functional group may be allowed to be present in the monomer structure or after the formation of polymer fine particles, may be added to the surface thereof by the graft polymerization or the like.

In the present invention, the core-shell structure means such as a form that two or more polymers different in the composition are present within a particle while causing phase separation. Accordingly, the shell part may completely cover the core part or may cover a part of the core part. Also, a part of the shell part polymer may form a domain or the like inside the core particle. Furthermore, a multilayer structure comprising three or more layers may also be used, where one or more layer having a different composition is further provided between the core part and the shell part.

If the coloring agent and the polymer fine particle are different in the ionicity, these cause aggregation and therefore, these coloring agent and polymer fine particle cannot be used within the same, system. Together with a color ink or a blank ink, a polymer fine particle having the same ionicity as the coloring agent can be further contained in the same system (the same ink). It is considered that when the color ink and the black ink different in the ionicity further contain a polymer fine particle and come into contact with each other on a recording medium, the aggregate is formed at a higher rate as compared with the case only containing a coloring agent and therefore, blurring or color-bleeding hardly occurs.

The polymer fine particle for use in the present invention preferably has a film forming property. The term "film forming property" means that when polymer fine particles are dispersed in water to form a polymer emulsion, a polymer film is formed accompanying the evaporation of water component as the continuous phase of the polymer emulsion. The ink composition having added thereto these polymer fine particles has a property such that when water or an aqueous organic solvent is removed from the periphery of the polymer fine particle, a polymer film is formed in the same manner as above. This polymer film has a role of firmly fixing the coloring agent in the ink composition to the surface of a recording medium. It is considered that by this fixing, an image having excellent fixing property and high scratch resistance can be realized.

The glass transition temperature of the polymer constituting the polymer fine particle of the present invention is 30° C. or less, preferably 25° C. or less, more preferably 20° C. or less. When the glass transition temperature of polymer constituting the polymer fine particle is within the above-described range, a film can be formed at room temperature. The glass transition temperature of the polymer constituting the polymer fine particles is determined from a differential heat curve obtained by evaporating an aqueous medium in the polymer emulsion to allow only a polymer to remain, placing the polymer in a sample vessel, setting the sample vessel in a differential scanning calorimeter apparatus (DSC) and heating it at −20° C. to 40° C. and a temperature-rising rate of 5° C./min.

The lowest film formation temperature of the polymer emulsion comprising the polymer fine particles of the present invention is 30° C. or less, preferably room temperature (about 25° C. or less), more preferably 20° C. or less. That the film formation of the polymer emulsion can be performed at 30° C. or less is preferred because the film formation on the printed surface automatically proceeds at room temperature or less without heating or drying the printed recording medium and the coloring agent is firmly fixed to the recording medium. The lowest film formation temperature means the lowest temperature where when the polymer emulsion is thinly cast on a metal plate such as aluminum and the temperature is elevated, a transparent continuous film is formed. With a temperature in the region less than the lowest film formation temperature, the polymer emulsion turns into white powder.

The polymer fine particle of the present invention preferably comprises a polymer component having both a hydrophilic moiety and a hydrophobic moiety. The weight average molecular weight of the polymer fine particles is 5,000 or more, preferably 10,000 or more. The weight average molecular weight of the polymer fine particles is determined by dissolving a polymer obtained after removing the water component of the polymer emulsion, in an organic solvent such as tetrahydrofuran and measuring the resulting solution using gel penetration chromatography (GPC). The molecular weight is calibrated using a monodisperse polystyrene.

The average particle size of the polymer emulsion is preferably 400 nm or less, more preferably from 100 to 200 nm, still more preferably from 10 to 100 nm. The average particle size of the polymer fine particles may be measured by a general method. Particularly, a value determined by a laser scattering method is preferably used.

Examples of the main component of the polymer fine particle for use in the present invention include an acryl-based copolymer, a styrene-acryl copolymer, a styrene-butadiene copolymer, polybutadiene, polyisoprene, an acetonitrile butadiene copolymer, a chloroprene copolymer, polyolefin, polystyrene, an ethylene-vinyl acetate copolymer, polyamide, polyurethane and a silicon-containing polymer.

In a preferred embodiment of the present invention, the polymer emulsion obtained by dispersing the polymer fine particles in water to a condensation of 10% by weight preferably forms a contact angle of about 70° or more, more preferably about 80° or more, on a teflon board. Furthermore, the polymer emulsion obtained by dispersing the polymer fine particles in water to a concentration of 35% by weight preferably has a surface tension of about $40 \times 10^{-3}$ N/m (at 2020 C.), more preferably about $50 \times 10^{-3}$ N/m (at 20° C.). By using such polymer fine particles, flight curve can be more successfully prevented in the ink jet recording method and good printing can be performed.

In a preferred embodiment of the present invention, the polymer fine particle preferably comprises from 1 to 10% by weight of a structure derived from an unsaturated vinyl monomer having a carboxyl group, has a structure crosslinked by a crosslinkable monomer having two or more polymerizable double bonds and comprises from 0.2 to 4% by weight of a structure derived from the crosslinkable monomer. This polymer fine particle can be free of dissolution of polymer components or swelling or the like of the polymer due to the organic solvent used in ink, particularly a glycol ether such as diethylene glycol monobutyl ether and triethylene glycol monobutyl ether, while maintaining the film forming property and therefore, exhibits excellent solvent resistance. As a result, a phenomenon of the link composition wetting the surface of the nozzle plate hardly occurs, the flight curve can be more successfully prevented and the ejection stability can be more elevated.

By the use of a crosslinkable polymer three-dimensionally crosslinked by copolymerizing a crosslinkable monomer having two or more, preferably three or more double bonds capable or copolymerizing at the polymerization of polymer fine particles, the surface of the nozzle plate is more difficulty wetted by the ink composition, the flight curve can be more successfully prevented and the ejection stability can be more elevated.

The polymer emulsion of the present invention can be obtained by mixing water, a monomer, and emulsifying agent and a polymerization initiator, performing the emulsion-polymerization and then adding a pH controlling agent to adjust the polymer emulsion to a desired pH. In the present invention, the polymer fine particles constituting the dispersion phase of the polymer emulsion are produced by the method described above.

The monomer which can be used is a generally employed radical polymerizable monomer. Examples thereof include monomers having a radical polymerizable group, for example, styrene and styrene derivatives such as methyl styrene, dimethyl styrene, chlorostyrene, dichlorostyrene, bromostyrene, P-chloromethylstyrene and divinylbenzene; monofunctional acrylic acid esters such as methyl acrylate, ethyl acrylate, n-butyl acrylate, butoxyethyl acrylate, benzyl acrylate, phenyl acrylate, phenoxyethyl acrylate, cyclohexyl acrylate, dicyclopentanyl acrylate, dicyclopentenyl acrylate, dicyclopentenyloxyethyl acrylate, tetrahydrofurfuryl acrylate, isobornyl acrylate, 2-hydroxyethyl acrylate, 2-hydroxypropyl acrylate, caprolactone acrylate and glycidyl acrylate; monofunctional methacrylic acid ester such as methyl methacrylate, ethyl methacrylate, n-butyl methacrylate, 2-ethylhexyl methacrylate, butoxymethyl methacrylate, benzyl methacrylate, phenyl methacrylate, phenoxyethyl methacrylate, cyclohexyl methacrylate, dicyclopentanyl methacrylate, dicyclopentenyl methacrylate, dicyclopentenyloxyethyl methacrylate, tetrahydrofurfuryl methacrylate, isobornyl methacrylate, 2-hydroxyethyl methacrylate, 2-hydroxypropyl methacrylate, 2-hydroxybutyl methacrylate, glycerol methacrylate, caprolactone methacrylate and glycidyl methacrylate; allyl compounds such as allylbenzene, allyl-3-cyclohexane propionate, 1-allyl-3,4-dimethoxybenzene, allylphenoxy acetate, allylphenyl acetate, allylcyclohexane and polyhydric allyl carboxylate; esters such as fumaric acid, maleic acid and itaconic acid; acetonitrile, methacrylonitrile, N-substituted maleimide and cyclic olefin.

Examples of the monomer which imparts anionicity to the polymer fine particle include monomers having a carboxyl group, a sulfonic acid group or a phosphor group. Examples of the acryl monomer having a carboxyl group include an acrylic acid, a methacrylic acid, a crotonic acid, an ethylacrylic acid, a propylacrylic acid, an isopropylacrylic acid, an itaconic acid and a fumaric acid. Examples of the (meth)acryl monomer having a sulfonic acid group include sulfoethyl methacrylate, butylacrylamide-sulfonic acid and 2-acrylamide-2-methylpropanesulfonic acid. Examples of the (meth)acryl monomer having a phosphor group include phosphoethyl methacrylate.

Examples of the monomer which imparts a cationic group to the polymer fine particle include monomers having a cationic, group selected from the group consisting of a primary fatty amino salt, a secondary fatty amine salt, a tertiary fatty amine salt and quaternary fatty amine salt. Specific examples thereof include N,N'-dimethylacrylamide, N,N'-dimethylaminoethyl acrylate, N,N'-dimethylaminoethyl methacrylate, N,N'-diethylaminoethyl methacrylate, N,N'-dimethylaminopropylacrylamide, dimethylaminoethylmethylchloride methacrylate and dimethylaminoethylbenzylchloride methacrylate.

Examples of the crosslinkable monomer include ethylene glycol diacrylate, diethylene glycol diacrylate, triethylene glycol diacrylate, tetraethylene glycol diacrylate, polyethylene glycol diacrylate, allyl acrylate, bis(acryloxyethyl) hydroxyethyl isocyanurate, bis(acryloxyneopentyl glycol) adipate, 1,3-butyrene glycol diacrylate, 1,6-hexanediol diacrylate, neopentyl glycol diacrylate, propylene glycol diacrylate, polypropylene glycol diacrylate, 2-hydroxy-1,3-diacryloxypropane, 2,2-bis[4-(acryloxy)phenyl]propane, 2,2-bis[4- (acryloxyethoxy)phenyl]propane, 2,2-bis[4-(acryloxyethoxy.polyethoxy)phenyl]propane, 2,2-bis[4-(acryloxyethoxy-polyethoxy)phenyl]propane, neopentyl glycol hydroxypivalate diacrylate, 1,4-butanediol diacrylate, dicyclopentanyl diacrylate, dipentaerythritol hexaacrylate, dipentaerythritol monohydroxy pentaacrylate, ditrimethylol propane tetracrylate, pentaerythritol triacrylate, tetrabromobisphenol A diacrylate, triglycerol diacrylate, trimethylolpropane triacrylate, tris(acryloxyethyl)isocyanurate, ethylene glycol dimethacrylate, diethylene glycol dimethacrylate, triethylene glycol dimethacrylate, tetraethylene glycol dimethacrylate, polyethylene glycol dimethacrylate, propylene glycol dimethacrylate, polypropylene glycol dimethacrylate, 1,3-butylene glycol dimethacrylate, 1,4-butanediol dimethacrylate, 1,6-hexanediol dimethacrylate, neopentyl glycol dimethacrylate, 2-hydroxy-1,3-dimethacryloxypropane, 2,2-bis[4-(methacryloxy)phenyl]propane, 2,2-bis[4-(methacryloxyethoxy)phenyl]propane, 2,2-bis[4-(methacryloxydiethoxy)phenyl]propane, 2,2-bis[4-(methacryloxyethoxypolyethoxy)phenyl]propane, tetrabromobisphenol A dimethacrylate, dicyclopentanyl dimethacrylate, dipentaerythritol hexamethacrylate, glycelol dimethacrylate, neopentyl glycol hydroxypivalate dimethacrylate, dipentaerythritol monohydroxy pentamethacrylate, ditrimethylolpropane tetramethacrylate, pentaerythritol trimethacrylate, pentaerythritol tetramethacrylate, triglycelol dimethacrylate, trimethylolpropane trimethacrylate, tris(methacryloxyethyl) isocyanurate, allyl methacrylate, divinylbenzene, diallyl phthalate, diallyl terephthalate, diallyl isophthalate and diethylene glycol bisallyl carbonate.

Tho polymerization initiator which can be used may be any water-soluble radical polymerization initiator such as an inorganic peracid salt (e.g., potassium persulfate, ammonium persulfate, sodium persulfate, potassium perphosphate, sodium perborate), 2,2'-azobis(2-methylpropionamidine)dihydrochloride, 2,2'-azobis(2-amidinopropane)dihydrochloride, 2,2'-azobis[2-(5-methyl-2-imidazolin-2-yl)propane]dihydrochloride, 2,2'-azobis[2-(2-imidazolin-2-yl)propane]dihydrochloride, 2,2'-azobis{2-methyl-N-[1,1-bis(hydroxymethyl)-2-hydroxyethyl]-propionamide}, 2,2'-azobis[2-methyl-N-(2-hydroxyethyl)-propionamide] and 4,4'-azobis(4-cyanovaleric acid). The amount of the catalyst added may be appropriately selected.

In a preferred embodiment of the present invention, the ink of the present invention may contain a water-soluble organic solvent. Specific examples thereof include alkyl alcohols having from 1 to 4 carbon atoms such as ethanol, methanol, butanol, propanol and isopropanol, glycol alcohols such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, propylene glycol mono-n-butyl ether and dipropylene glycol mono-n-butyl ether, formamide, acetamide, dimethylsulfoxide, sorbitol, sorbitan, acetin, diacetin, triacetin and sulfolane.

In a preferred embodiment of the present invention, among the above-described water-soluble organic solvent, a water-soluble organic solvent having a boiling point of 180° C. or more is preferably used. The use of a water-soluble organic solvent having a boiling point of 180° C. or more brings water retentivity and wettability of the ink, as a result, an ink capable of maintaining the fluidity and the redispersibility for a long period of time even if the ink is left standing in an open state (in a state contacting with an air at room temperature) can be realized. Furthermore, clogging of a nozzle does not occur during printing or at the restarting after the interruption of printing and high ejection stability can be obtained.

Specific examples of the water-soluble organic solvent having a boiling point of 180° C. or more include ethylene glycol, propylene glycol, diethylene glycol, pentamethylene glycol, trimethylene glycol, 2-butene-1,4-diol, 2-ethyl-1,3-hexane diol, 2-methyl-2,4-pentanediol, 1-methyl-2-Pyrrolidone, 1,3-dimethyl-2-imidazolidinone, 2-Pyrrolidone, glycerol, tripropylene glycol monomethyl ether, dipropylene glycol monoethyl glycol, dipropylene glycol monoethyl ether, dipropylene glycol monomethyl ether, dipropylene glycol, triethylene glycol monomethyl ether, tetraethylene glycol, triethylene glycol, diethylene glycol monobutyl ether, diethylene glycol monoethyl ether, diethylene glycol monomethyl ether, tripropylene glycol, polyethylene glycol having a molecular weight of 2,000 or less, 1,3-propylene glycol, isopropylene glycol, isobutylene glycol, 1,4-butanediol, 1,3-butanediol, 1,5-pentanediol, 1,6-hexanediol, glycerol, mesoerythritol and pentaerythritol. The water-soluble organic solvent preferably has a boiling point of 200° C. or more. These water-soluble organic solvents may be used individually or as a mixture of two or more thereof.

The content of the water-soluble organic solvent is preferably on the order of 10 to 50% by weight, more preferably from 10 to 30% by weight.

The ink composition of the present invention may also contain a sugar. Specific examples of the saccharide include monosaccharide, disaccharide, oligosaccharide (including trisaccharide and tetrasaccharide) and polysaccharide. Preferred examples thereof include glucose, mannose, fructose, ribose, xylose, arabinose, galactose, aldonic acid, glycitol, sorbitol, maltose, cellobiose, lactose, sucrose, trehalose and maltotriose. The term "polysaccharide" as used herein means sugars in a broad sense and includes substances widely present in the nature world. Examples of the derivatives of these saccharides include reducing sugars such as sugar alcohol [represented by the formula: $HOCH_2(CHOH)_n CH_2OH$ (wherein n represents an integer of 2 to 5)], oxidized sugars such as aldonic acid and uronic acid, amino acids and thiosugar. Among these, sugar alcohols are preferred and specific examples thereof include maltitol and sorbitol.

In a preferred embodiment of the present invention, the black ink (A) comprises at least a water-soluble organic solvent, water and a coloring agent comprising a coloring material enclosed with a polymer having a cationic group, or (B) comprises at least a water-soluble organic solvent, water and a coloring agent comprising a coloring material enclosed with a polymer having a cationic group and having a crosslinked structure. In either case of (A) and (B), the surface tension is preferably from 45 to 60 mN/m. The color ink comprises (C) at least a water-soluble organic solvent, water and a coloring agent comprising a coloring material enclosed with a polymer having an anionic group, or (D) comprises at least a water-soluble organic solvent, water and a coloring agent comprising a coloring material enclosed with a polymer having an anionic group and having a crosslinked structure. The surface tension thereof is preferably from 25 to 45 mN/m.

In order to adjust the surface tension to the above-described range, the color inks (C) and (D) each further contains an anionic surfactant and/or a nonionic surfactant or a glycol ether. More specifically, in the color ink (C), an anionic surfactant and/or a nonionic surfactant is added to adjust the surface tension to the above-described range. On the other hand, in the color ink (D), an anionic surfactant and/or a nonionic surfactant, or these surfactants and a glycol ether are added to adjust the surface tension to the above-described range.

In another preferred embodiment of the present invention, the black ink (E) comprises at least a water-soluble organic solvent, water and a coloring agent comprising a coloring material enclosed with a polymer having an anionic group, or (F) comprises at least a water-soluble organic solvent, water and a coloring agent comprising a coloring material enclosed with a polymer having an anionic group and having a crosslinked structure. In either case of (E) and (F), the surface tension is preferably from 45 to 60 mN/m. The color ink (C) comprises at least a water soluble organic solvent, water and a coloring agent comprising a coloring material enclosed with a polymer having a cationic group, or (H) comprises at least a water-soluble organic solvent, water and a coloring agent comprising a coloring material enclosed with a polymer having a cationic group and having a crosslinked structure. The surface tension thereof is preferably from 25 to 45 mN/m.

In order to adjust the surface tension to the above-described range, the color inks (G) and (T) each further contains a cationic surfactant and/or a nonionic surfactant or a glycol ether. More specifically, in the color ink (G), a cationic surfactant and/or a nonionic surfactant are added to adjust the surface tension to the above-described range, and in the color ink (H), a cationic surfactant and/or a nonionic surfactant, or these surfactants and a glycol ether are added to adjust the surface tension to the above-described range.

In still another preferred embodiment of the present invention, the inks (A) to (H) (black ink or color ink) each contains an anionic polymer fine particle or a cationic polymer fine particle. Here, the polymer fine particle added has the same ionicity as the coloring agent. More specifically, in the above-described inks (A) to (H), an anionic polymer fine particle is used in combination with "a coloring agent comprising a coloring material enclosed with a polymer having an anionic group or a coloring agent comprising a coloring material enclosed with a polymer having an anionic group and having a crosslinked structure", whereas a cationic polymer fine particle is used in combination with "a coloring agent comprising a coloring material enclosed with a polymer having a cationic group or a coloring agent comprising a coloring material enclosed with a polymer having a cationic group and having a crosslinked structure".

Also in this case, similarly to the above, the surface tension of the black ink is preferably from 45 to 60 mN/m and the surface tension of the color ink is preferably from 25 to 45 mN/m.

If the surface tension of the black ink is less than the above-described range, the pigment ink penetrates into the inside of a recording medium at an excessively high rate and therefore, blurring, feathering or reduction of color density readily occurs. On the other hand, if the surface tension of the color ink exceeds the above-described range, the ink penetrates at a low rate and this is liable to cause color bleeding.

In the present invention, an ink set of the above-described black ink and color ink is preferably used.

Furthermore, the color ink for use in the present invention is preferably a set of yellow ink, magenta ink and cyan ink, more preferably a set of yellow ink, magenta ink, cyan ink, light cyan ink and light magenta ink.

The surfactant used in the ink composition for ink jet recording of the present invention preferably has good compatibility with the ink composition and at the same time, preferably exhibits high and stable penetration.

With respect to specific examples of the surfactant, specific examples of the anionic surfactant include sodium dodecylbenzenesulfonate, sodium laurate and ammonium salt of polyoxyethylene alkyl ether sulfate; and specific examples of the nonionic surfactant include polyoxyethylene alkylphenyl ether, polyoxyethylene nonylphenyl ether, polyoxyethylene octylphenyl ether, polyoxyethylene dodecylphenyl ether, polyoxyethylene alkyl allyl ether, polyoxyethylene oleyl ether, polyoxyethylene lauryl ether, polyoxyethylene alkyl ether, polyoxyalkylene alkyl ether, polyoxyethylene alkyl ester, polyoxyethylene alkylamine, polyoxyethylene alkylamide, polyoxyethylene sorbitan fatty acid ester, polyoxyethylene oleic acid, polyoxyethylene oleic acid ester, polyoxyethylene distearic acid ester, sorbitan laurate, sorbitan monostearate, sorbitan monooleate, sorbitan sesquioleate, polyoxyethylene monooleate, polyoxyethylene stearate and acetylene glycol. These surfactants can be used individually or in combination of two or more thereof.

Examples of the cationic surfactant include primary fatty amine salts, secondary fatty amine salts, tertiary fatty amine salts and quaternary ammonium salts. Examples of the quaternary ammonium salt include tetraalkylammonium salts, trialkylbenzylammonium salts, alkylpyridinium salts, 2-alkyl-1-alkyl-1-hydroxyethylimidazolium salts and N,N'-dialkylmorpholinium salts.

The surface tension of the ink composition is controlled by adding a surfactant and thereby, the penetration into a recording medium is controlled, so that when the ink set of the present invention is used, the image quality and the quick drying property can be improved at the printing on various kinds of recording mediums.

The amount of the surfactant added is preferably from 0.01 to 10% by weight, more preferably from 0.1 to 5% by weight, based on the ink composition.

In a preferred embodiment of the present invention, among the above-described surfactants, an acetylene glycol-base surfactant is preferably added. The acetylene glycol-base surfactant is preferred because this surfactant causes less bubbling of the ink when added and provides an effect of reducing the surface tension even with a relatively small amount. Furthermore, the addition of the acetylene glycol-base surfactant has an effect of controlling the surface tension and improving the penetrability of the ink solvent component and in the present invention, an effect of accelerating the separation between the coloring agent and the ink solvent is provided, so that the image quality and the quick drying property can be improved at the printing on every kinds of plain paper or recycled paper.

Specific preferred examples of the acetylene glycol-base surfactant for use in the present invention include the compound represented by the following formula (VII).

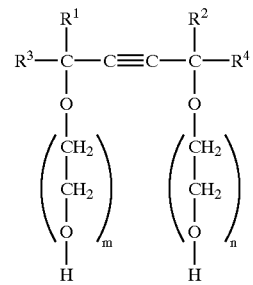

(wherein $0 \leqq m+n \leqq 50$, and $R^1$, $R^2$, $R^3$ and $R^4$ each is independently an alkyl group).

Among the compounds represented by formula (VII), more preferred are 2,4,7,9-tetramethyl-5-decyne-4,7-diol, 3,6-dimethyl-4-octyne-3,6-diol and 3,5-dimethyl-hexyne-3-ol. The acetylene glycol-base surfactant represented by formula (VII) may also be a commercially available product and specific examples thereof include Surfynol 104, 82, 465 and TG (all produced by Air Products and Chemicals INC.), and Olfin STG and Olfin E1010 (both produced by Nissin Kagaku).

The amount of the acetylene glycol-base surfactant added is appropriately selected such that the ink composition has a surface tension within the above-described range but is preferably from 0.01 to 5% by weight, more preferably from 0.1 to 5% by weight, based on the ink composition.

Examples of the glycol ethers used in the ink composition for ink jet recording of the present invention include diethylene glycol monobutyl ether, triethylene glycol monobutyl ether, propylene glycol monobutyl ether and dipropylene glycol monobutyl ether. The combination use of a glycol ether and the above-described acetylene glycol-base surfactant provides an effect of further improving the penetrability of the ink solvent components and therefore, in the present invention, a remarkably high effect of accelerating the separation between the coloring agent and the ink solvent is provided, so that the image quality and the quick drying property can be improved at the printing on every kinds of plain paper or recycled paper.

The amount of the glycol ether added is appropriately selected such that the ink composition has a surface tension within the above-described range but is preferably from 0.1 to 10% by weight, more preferably from 0.1 to 5% by weight, based on the ink composition.

In the present invention, for the purpose of controlling the penetrability, a 1,2-alkylene glycol having from 4 to 10 carbon atoms may also be added within the range of 15% by weight or less. If the number of carbon atoms is 3 or less, the ink composition cannot have penetrability, whereas if the number of carbon atoms exceeds 10, the 1,2-alkylene glycol is not easily dissolved in water and this is not preferred. If the amount added thereof exceeds 15% by weight, the viscosity is disadvantageously liable to increase.

The 1,2-alkylene glycol is specifically 1,2-pentanediol or 1,2-hexanediol and either one may be used or both may be used in combination. The 1,2-pentanediol is preferably added in the range from 3 to 15% by weight. If the amount added thereof is less than 3% by weight, good penetrability cannot be obtained. The 1,2-hexanediol is preferably added in the range from 0.5 to 10% by weight. If the amount added thereof is less than 0.5% by weight, good penetrability cannot be obtained.

In addition, for the purpose of improving the storage stability, additives such as pH adjusting agent, dissolution aid, antioxidant, fungicide, antiseptic, corrosion inhibitor and metal salt trapping agent may be added to the ink, if desired.

The ink composition of the prevent invention can be produced by dispersing and mixing the above-described components using an appropriate method. Particularly, the ink composition of the prevent invention can be easily obtained by stirring and mixing the coloring agent of the present invention, water, an aqueous organic solvent and, if desired, other additives.

The ink composition of the present invention ensures excellent dispersion stability, high ejection stability, no occurrence of nozzle clogging over a long period of time, and stable printing. The reasons therefor are described below.

In the case of dispersing a pigment, a surfactant of a dispersant such as polymer dispersant is generally used but since such a dispersant is only adsorbing to the coloring material, the dispersant is usually liable to split off from the coloring material surface due to some environmental factors.

On the other hand, in the present invention, it is considered that the polymer embracing the coloring material is more firmly fixed to the coloring material and therefore, the dispersant is not easily eliminated from the coloring material. More specifically, in the case where a pigment dispersion solution obtained by dispersing a pigment using a surfactant or a dispersant such as polymer dispersant is combined with a surfactant or a penetrant such as diethylene glycol monobutyl ether, triethylene glycol monobutyl ether, propylene glycol monobutyl ether, dipropylene glycol monobutyl ether and 1,2-alkylene glycol to improve the penetrability of ink, the dispersant adsorbing to the pigment surface is readily eliminated due to a strong shear force applied to the ink at the ejection through a narrow nozzle, whereby the dispersibility is deteriorated and unstable ejection sometimes results. On the other hand, in the case of the ink composition using the coloring agent according to the present invention, such a phenomenon is not observed at all and stable ejection can be attained. Particularly, in an embodiment where the coloring material is enclosed with a polymer having a crosslinked structure, since the polymer embracing the coloring material in more firmly fixed to the coloring material and the polymer has excellent solvent resistance due to its crosslinked structure, even when the above-described penetrant or the like is used, the polymer embracing the coloring material is not eliminated from the coloring material and the polymer itself does not easily swell. Therefore, according to this embodiment, more excellent dispersion stability can be ensured over a long period of time.

In the case where a pigment ink prepared by dispersing a pigment using a surfactant or a dispersant such as polymer dispersant is improved in the penetrability by the use of a surfactant or a penetrant, the viscosity of the ink is generally liable to elevate due to the dispersant not adsorbed to the pigment surface but dissolved in a solution from the beginning or the dispersant eliminated from the pigment in a later environment. Therefore, the pigment content must be limited so as to adjust the ink viscosity to the range suitable for ink jet recording (a range from 1 to 10 mPa·s). For this reason, a sufficiently high printing density and good coloration cannot be obtained on plain paper or recycled paper and in turn, a high printing image quality can be hardly realized. On the other hand, in the case of the coloring agent according to the present invention, the polymer embracing the coloring material is not eliminated from the coloring material and therefore, the viscosity of the ink is scarcely changed depending on the content of the coloring agent. Accordingly, the ink can be easily reduced in the viscosity and can contain the coloring agent in a large amount, so that a sufficiently high printing density can be obtained on plain paper or recycled paper. These reasons are used only for the purpose of describing the present invention and the scope of the present invention is not limited by these reasons.

The ink set of the present invention comprises a black ink and a plurality of color inks and this ink set is preferably used for the ink jet recording method of performing the printing by ejecting and adhering ink droplets to a recording medium. More specifically, the ink set of the present invention is preferably used for the method of ejecting ink small droplets through a fine nozzle and thereby recording a letter or a figure on the surface of a recording medium.

Examples of the ink jet recording system include a method of converting electric signals into mechanical signals using an electrostrictive element and intermittently ejecting an ink stored in a nozzle head part, thereby recording a letter or a symbol on the surface of a recording medium, and a method of rapidly heating a portion very close to the ejection part to generate bubbles in an ink stored in a nozzle head part and intermittently ejecting the ink using the cubic expansion due to the bubbles, thereby recording a letter or a symbol on the surface of a recording medium. However, the present invention is not limited to these methods.

The ink set for ink jet recording at the present invention comprises a color ink composition comprising at least a water-soluble organic solvent, water and a coloring agent comprising a coloring material enclosed with a polymer having an anionic group, and a black ink composition comprising at least a water-soluble organic solvent, water and a coloring agent comprising a coloring material enclosed with a polymer having a cationic group (Ink Set (a)).

As another embodiment of this ink set, anionic polymer fine particles are further added to the color ink composition and/or cationic polymer fine particles are further added to the black ink composition.

In another embodiment of the present invention, the ink set for ink jet recording comprises a color ink composition comprising at least a water-soluble organic solvent, water and a coloring agent comprising a coloring material enclosed with a polymer having an anionic group and having a crosslinked structure, and a black ink composition comprising at least a water-soluble organic solvent, water and a coloring agent comprising a coloring material enclosed with a polymer having a cationic group and having a crosslinked structure (Ink Set (b)).

As another embodiment of this ink set, anionic polymer fine particles are further added to the color ink composition and/or cationic polymer fine particles are further added to the black ink composition.

In still another embodiment of the present invention, the ink set for ink jet recording comprises a color ink composition comprising at least a water-soluble organic solvent, water and a coloring agent comprising a coloring material enclosed with a polymer having an anionic group and having a crosslinked structure, and a black ink composition comprising at least a water-soluble organic solvent, water and a coloring agent comprising a coloring material enclosed with a polymer having a cationic group (Ink Set (c)).

As another embodiment of this ink set, anionic polymer fine particles are further added to the color ink composition and/or cationic polymer fine particles are further added to the black ink composition.

In still another embodiment of the present invention, the ink set for ink jet recording comprises at least a water-soluble organic solvent, water and a coloring agent comprising a coloring material enclosed with a polymer having a cationic group, and a black ink composition comprising at least a water-soluble organic solvent, water and a coloring agent comprising a coloring material enclosed with a polymer having an anionic group (Ink Set (d)).

As another embodiment of this ink set, anionic polymer fine particles are further added to the color ink composition and/or cationic polymer fine particles are further added to the black ink composition.

In still another embodiment of the present invention, the ink set for ink jet recording comprises a color ink composition comprising at least a water-soluble organic solvent, water and a coloring agent comprising a coloring material enclosed with a polymer having a cationic group and having a crosslinked structure, and a black ink composition comprising at least a water-soluble organic solvent, water and a coloring agent comprising a coloring material enclosed with a polymer having an anionic group and having a crosslinked structure (Ink set (e)).

As another embodiment of this ink set, anionic polymer fine particles are further added to the color ink composition and/or cationic polymer fine particles are further added to the black ink composition.

In still another embodiment of the present invention, the ink set for ink jet recording comprises a color ink composition comprising at least a water-soluble organic solvent, water and a coloring agent comprising a coloring material enclosed with a polymer having a cationic group and having a crosslinked structure, and a black ink composition comprising at least a water-soluble organic solvent, water and a coloring agent comprising a coloring material enclosed with a polymer having an anionic group (Ink Set (f)).

As another embodiment of this ink set, anionic polymer fine particles are further added to the color ink composition and/or cationic polymer fine particles are further added to the black ink composition.

According to the ink set of the present invention, when the black ink and the color ink in the ink set of the present invention come into contact on a recording medium, the dispersion state of the coloring agent in each ink is destroyed in a moment and the inks cohere, so that a high-quality image free of blurring, feathering or color bleeding and favored with high OD value can be obtained.

According to a preferred image-formation process in the above-described recording method, a black ink having a surface tension of 45 to 60 mN/m is preferably used immediately after an image is formed by a color ink having a surface tension of 25 to 45 mN/m. Furthermore, in the printing of a letter or the like on plain paper using a black ink, it is preferred to print a letter using any color ink and then perform the black ink printing on the same place, whereby when two inks come into contact on a recording medium, the dispersion state in each ink is destroyed in a moment and the inks cohere, so that a high-quality image free of blurring, feathering or color bleeding and favored with high OD value can be obtained.

According to another process, the cationic coloring agent of the present invention is used for ink of light color such as light cyan or light magenta and immediately after an image is first formed with the light color ink, printing is performed on the same place with a deep color ink such as cyan ink, magenta ink, yellow ink or black ink. In this case, the light color ink preferably has a lower surface tension than the deep color ink, whereby when the deep color ink and the light color ink come into contact on a recording medium, the dispersion state in each ink is destroyed in a moment and the inks cohere, so that a high-quality image free of blurring, feathering or color bleeding and favored with high OD value can be obtained.

The ink jet recording apparatus of the present invention has a structure of communicating an ink-housing container and a recording head through a manifold and comprises a mechanism of allowing the recording head to move along the carriage by means of a timing belt driven by a motor, a paper feeding mechanism having provided thereon a platen and a guide, and a mechanism for performing a cleaning operation. The ink jet recording apparatus of the present invention has a structure of housing each ink in an ink-housing container and feeding each ink composition to the recording head through a manifold, that is, where the ink-housing container and the recording head are communicated through a manifold. Insofar as the housing container has an independent form every each ink composition, the housing container may be used in the number corresponding to the number of inks used or the inside of the housing container may be partitioned to house a plurality of inks in the partitioned rooms. The recording head moves along the carriage by means of a timing belt driven by a motor. On the other hand, a recording medium such as paper is placed by a platen and a guide at the position facing the recording head. The cleaning mechanism, where a suction cap communicating with a suction cap is provided, performs a so-called cleaning operation. A waste ink tank for reservoiring the sucked ink composition is provided. Different recording heads may be used every each ink or the ink compositions may be allotted every each nozzle line with one recording head.

In the present invention, the black ink and the color ink each preferably use an independent recording head, so that an anionic coloring agent and a cationic coloring agent can be prevented from contacting and cohering on the same recording head and the formed aggregate can be prevented from causing clogging.

EXAMPLES

The present invention will be described in greater detail by referring to the following Examples, but the invention should not be construed as being limited thereto.

Production of Coloring Agent

Coloring Agent 1

To 100 g of water, 10 g of carbon black (Laben, produced by Colombian Carbon) and 6 g of 2-hydroxy-3-methacryloxypropyltrimethylammonium chloride as a polymerizable surfactant were added. The resulting solution was irradiated with ultrasonic waves and further dispersed for about 2 hours by a sand mill (manufactured by Yasukawa Seisakusho). The obtained dispersion solution was charged into a reactor equipped with an ultrasonic wave generator, a stirrer, a temperature regulator, a reflux condenser and a dropping funnel. Subsequently, an emulsified product previously prepared by mixing 1 g of benzyl methacrylate, 2 g of butyl methacrylate, 1 g of N,N'-dimethylaminoethyl methacrylate, 0.1 g of the above described polymerizable surfactant, 0.05 g of 2,2'-azobis(2-methylpropionamidine) dihydrochloride and 10 g of water was gradually added dropwise to the reactor through the dropping funnel. After the completion of dropwise addition, a polymerization reaction was performed at 60° C. for 48 hours. The obtained coloring agent dispersion was adjusted to around a pH of 6 with disodium citrate and filtered through a 0.4-μm filter to remove coarse particles, thereby obtaining a dispersion solution of Coloring Agent 1. The average particle size was measured by a size analyzer Microtrack UPA 150 (manufactured by Leeds & Northrup) employing a laser doppler system and found to be 120 nm.

Coloring Agent 2

In a reactor equipped with an ultrasonic wave generator, a stirrer, a temperature regulator, a reflux condenser and a dropping funnel, 50 g of carbon black (Laben C, produced by Colombian Carbon) and 30 g of dimethylaminoethylmethylchloride methacrylate as a polymerizable surfactant were added to 800 g of water. The resulting solution was dispersed by irradiating ultrasonic waves thereon for 4 hours. Subsequently, 16 g of N,N'-dimethylaminopropylacrylamide, 2,4 g of divinylbenzene and 1 g of 2,2'-azobis(2-methylpropionamidine) dihydrochloride were further added and a polymerization reaction was performed at 60° C. for 48 hours. The reaction product was adjusted to around a pH of 6 with disodium citrate and filtered through a 0.4-μm filter to remove coarse particles, thereby obtaining a dispersion solution of Coloring Agent 2. The average particle size was measured by a size analyzer Microtrack UPA 150 (manufactured by Leeds & Northrup) employing a laser doppler system and found to be 110 nm.

Coloring Agent 3

To 800 g of water, 100 g of C.I. Pigment Red 122 and 60 g of polymerizable surfactant SE-10N (produced by Asahi Denka K.K.) were added. The resulting solution was irradiated with ultrasonic waves and further dispersed for about 2 hours by a sand mill (manufactured by Yasukawa Seisakusho). The obtained dispersion solution was charged into a reactor equipped with an ultrasonic wave generator, a stirrer, a temperature regulator, a reflux condenser and a dropping funnel. Subsequently, an emulsified product previously prepared by mixing 10 g of benzyl methacrylate, 20 g of butyl methacrylate, 2 g of dicyclopentanyl methacrylate, 10 g of methacrylic acid, 1 g of the above-described polymerizable surfactant, 0.5 g of potassium persulfate and 100 g of water was gradually added dropwise to the reactor through the dropping funnel. After the completion of dropwise addition, a polymerization reaction was performed at 60° C. for 48 hours. The obtained coloring agent dispersion was adjusted to around a pH of 8 with potassium hydroxide and filtered through a 0.4-μm filter to remove coarse particles, thereby obtaining a dispersion solution of Coloring Agent 3. The average particle size was measured by a size analyzer Microtrack UPA 150 (manufactured by Leeds & Northrup) employing a laser doppler system and found to be 130 nm.

Coloring Agent 4

In a reactor equipped with an ultrasonic wave generator, a stirrer, a temperature regulator, a reflux condenser and a dropping funnel, 50 g of C.I. Pigment Blue 15:3 and 30 g of polymerizable surfactant SE-10N (produced by Asahi Denka K.K.) were added to 500 g of water. The resulting solution was dispersed by irradiating ultrasonic waves thereon for 4 hours. Subsequently, 16 g of 2-acrylamide-2-methylpropanesulfonic acid, 3 g of acetonitrile and 0.5 g of potassium persulfate were further added and a polymerization reaction was performed at 60° C. for 48 hours. The obtained coloring agent dispersion was adjusted to around a pH of 8 with potassium hydroxide and filtered through a 0.4-μm filter to remove coarse particles, thereby obtaining the objective coloring agent in the form of a dispersion solution. Thus, a dispersion solution of Coloring Agent 4 was obtained. The average particle size was measured by a size analyzer Microtrack UPA 150 (manufactured by Leeds & Northrup) employing a laser doppler system and found to be 115 nm.

Coloring Agent 5

To 800 g of water, 100 g of C.I. Pigment Yellow 185 and 60 g of polymerizable surfactant SE-10N (produced by Asahi Denka K.K.) were added. The resulting solution was irradiated with ultrasonic waves and further dispersed for about 2 hours by a sand mill (manufactured by Yasukawa Seisakusho). The obtained dispersion solution was charged into a reactor equipped with an ultrasonic wave generator, a stirrer, a temperature regulator, a reflux condenser and a dropping funnel. Subsequently, an emulsified product previously prepared by mixing 10 g of benzyl methacrylate, 20 g of butyl methacrylate, 2 g of dicyclopentanyl methacrylate, 10 g of methacrylic acid, 1 g of the above-described polymerizable surfactant, 0.5 g of potassium persulfate and 100 g of water was gradually added dropwise to the reactor through the dropping funnel. After the completion of dropwise addition, a polymerization reaction was performed at 60° C. for 48 hours. The obtained coloring agent dispersion was adjusted to around a pH of 8 with potassium hydroxide and filtered through a 0.4-μm filter to remove coarse particles, thereby obtaining a dispersion solution of Coloring Agent 5. The average particle size was measured by a size analyzer Microtrack UPA 150 (manufactured by Leeds & Northrup) employing a laser doppler system and found to be 120 nm.

Coloring Agent 6

To 800 g of water, 100 g of C.I. Pigment Red 122 and 60 g of polymerizable surfactant SE-10N (produced by Asahi Denka K.K.) were added. The resulting solution was irradiated with ultrasonic waves and further dispersed for about 2 hours by a sand mill (manufactured by Yasukawa Seisakusho). The obtained dispersion solution was charged into a reactor equipped with an ultrasonic wave generator, a stirrer, a temperature regulator, a reflux condenser and a dropping funnel. Subsequently, an emulsified product previously prepared by mixing 10 g of benzyl methacrylate, 20 g of butyl methacrylate, 2 g of dicyclopentanyl dimethacrylate, 10 g of methacrylic acid, 1 g of the above-described polymerizable surfactant, 0.5 g of potassium persulfate and 100 g of water was gradually added dropwise to the reactor through the dropping funnel. After the completion of dropwise addition, a polymerization reaction was performed at 60° C. for 48 hours. The obtained coloring agent dispersion was adjusted to around a pH of 8 with potassium hydroxide and filtered through a 0.4-μm filter to remove coarse particles, thereby obtaining a dispersion solution of Coloring Agent 6. The average particle size was measured by a size analyzer Microtrack UPA 150 (manufactured by Leeds & Northrup) employing a laser doppler system and found to be 130 nm.

Coloring Agent 7

In a reactor equipped with an ultrasonic wave generator, a stirrer, a temperature regulator, a reflux condenser and a dropping funnel, 50 g of C.I. Pigment Blue 15:3 and 30 g of polymerizable surfactant SE-10N (produced by Asahi Denka K.K.) were added to 500 g of water. The resulting solution was dispersed by irradiating ultrasonic waves thereon for 4 hours. Subsequently, 16 g of 2-acrylamide-2-methylpropanesulfonic acid, 3 g of acetonitrile, 5 g of divinylbenzene and 0.5 g of potassium persulfate were further added and a polymerization reaction was performed at 60° C. for 48 hours. The obtained coloring agent dispersion was adjusted to around a pH of 8 with potassium hydroxide and filtered through a 0.4-μm filter to remove coarse particles, thereby obtaining a dispersion solution of Coloring Agent 7. The average particle size was measured by a size analyzer Microtrack UPA 150 (manufactured by Leeds & Northrup) employing a laser doppler system and found to be 140 nm.

Coloring Agent 8

To 800 g of water, 100 g of C.I. Pigment Yellow 151 and 60 g of polymerizable surfactant SE-10N (produced by Asahi Denka K.K.) were added. The resulting solution was irradiated with ultrasonic waves and further dispersed for about 2 hours by a sand mill (manufactured by Yasukawa Seisakusho). The obtained dispersion solution was charged into a reactor equipped with an ultrasonic wave generator, a stirrer, a temperature regulator, a reflux condenser and a dropping funnel. Subsequently, an emulsified product previously prepared by mixing 10 g of dicyclopentenyl methacrylate, 20 g of butyl methacrylate, 2 g of 1,6-hexanediol dimethacrylate, 10 g of methacrylic acid, 1 g of the above-described polymerizable surfactant, 0.5 g of potassium persulfate and 100 g of water was gradually added dropwise to the reactor through the dropping funnel. After the completion of dropwise addition, a polymerization reaction was performed at 60° C. for 48 hours. The obtained coloring agent dispersion was adjusted to around a pH of 8 with potassium hydroxide and filtered through a 0.4-μm filter to remove coarse particles, thereby obtaining a dispersion solution of Coloring Agent 8. The average particle size was measured by a size analyzer Microtrack UPA 150 (manufactured by Leeds & Northrup) employing a laser doppler system and found to be 110 nm.

Coloring Agent 9

To 100 g of water, 100 g of carbon black (Laben C, produced by Colombian Carbon) and 6 g of polymerizable surfactant SE 10N (produced by Asahi Denka K.K.) were added. The resulting solution was irradiated with ultrasonic waves and further dispersed for about 2 hours by a sand mill (manufactured by Yasukawa Seisakusho). The obtained dispersion solution was charged into a reactor equipped with an ultrasonic wave generator, a stirrer, a temperature regulator, a reflux condenser and a dropping funnel. Subsequently, an emulsified product previously prepared by mixing 1 g of benzyl methacrylate, 2 g of butyl methacrylate, 1 g of methacrylic acid, 0.1 g of the above-described polymerizable surfactant, 0.05 g of potassium persulfate and 10 g of water was gradually added dropwise to the reactor through the dropping funnel. After the completion of dropwise addition, a polymerization reaction was performed at 60° C. for 48 hours. The obtained coloring agent dispersion was adjusted to around a pH of 8 with potassium hydroxide and filtered through a 0.4-μm filter to remove coarse particles, thereby obtaining a dispersion solution of Coloring Agent 9. The average particle size was measured by a size analyzer Microtrack UPA 150 (manufactured by Leeds & Northrup) employing a laser doppler system and found to be 125 nm.

Coloring Agent 10

In a reactor equipped with an ultrasonic wave generator, a stirrer, a temperature regulator, a reflux condenser and a dropping funnel, 50 g of carbon black (Laben C, produced by Colombian Carbon) and 30 g of polymerizable surfactant SE-10 (produced by Asahi Denka K.K.) were added to 800 g of water. The resulting solution was dispersed by irradiating ultrasonic waves thereon for 4 hours. Subsequently, 16 g of acetonitrile, 2.4 g of divinylbenzene and 1 g of potassium persulfate were further added and a polymerization reaction was performed at 60° C. for 48 hours. The reaction product was adjusted to around a pH of 8 with potassium hydroxide and filtered through a 0.4-μm filter to remove coarse particles, thereby obtaining a dispersion solution of Coloring Agent 10. The average particle size was measured by a size analyzer Microtrack UPA 150 (manufactured by Leeds & Northrup) employing a laser doppler system and found to be 130 nm.

Coloring Agent 11

To 800 g of water, 100 g of C.I. Pigment Red 122 and 60 g of polymerizable surfactant 2-hydroxy-3-methacryloxypropyltrimethylammoniumchloride were added. The resulting solution was irradiated with ultrasonic waves and further dispersed for about 2 hours by a sand mill (manufactured by Yasukawa Seisakusho). The obtained dispersion solution was charged into a reactor equipped with an ultrasonic wave generator, a stirrer, a temperature regulator, a reflux condenser and a dropping tunnel. Subsequently, an emulsified product previously prepared by mixing 10 g of benzyl methacrylate, 20 g of butyl methacrylate, 2 g of dicyclopentanyl methacrylate, 10 g of N,N'-dimethylaminoethyl methacrylate, 1 g of the above-described polymerizable surfactant, 0.5 g of 2,2'-azobis(2-methylpropionamidine)dihydrochloride and 100 g of water was gradually added dropwise to the reactor through the dropping tunnel. After the completion of dropwise addition, a polymerization reaction was performed at 60° C. for 48 hours. The obtained coloring agent dispersion was adjusted to around a pH of 6 with disodium citrate and filtered through a 0.4-μm filter to remove coarse particles, thereby obtaining a dispersion solution of Coloring Agent 11 having a concentration of 18%. The average particle size was measured by a size analyzer Microtrack UPA 150 (manufactured by Leeds & Northrup) employing a laser doppler system and found to be 140 nm.

Coloring Agent 12

In a reactor equipped with an ultrasonic wave generator, a stirrer, a temperature regulator, a reflux condenser and a dropping funnel, 50 g of C.I. Pigment Blue 15:3 and 30 g of polymerizable surfactant dimethylaminoethylbenzylchloride methacrylate were added to 500 g of water. The resulting solution was dispersed by irradiating ultrasonic waves thereon for 4 hours. Subsequently, 16 g of N,N'-dimethylaminopropylacrylamide, 3 g of styrene and 0.5 g of 2,2'-azobis(2-methylpropionamidine)dihydrochloride were further added and a polymerization reaction was performed at 60° C. for 48 hours. The obtained coloring agent dispersion was adjusted to around a pH of 6 with disodium citrate and filtered through a 0.4-μm filter to remove coarse particles, thereby obtaining the objective coloring agent in the form of a dispersion solution. Thus, a dispersion solution of Coloring Agent 12 was obtained. The average particle size was measured by a size analyzer Microtrack UPA 150 (manufactured by Leeds & Northrup) employing a laser doppler system and found to be 105 nm.

Coloring Agent 13

To 800 g of water, 100 g of C.I. Pigment Yellow 185 and 60 g of polymerizable surfactant 2-hydroxy-3- methacryloxypropyltrimethylammonium chloride were added. The resulting solution was irradiated with ultrasonic waves and further dispersed for about 2 hours by a sand mill (manufactured by Yasukawa Seisakusho). The obtained dispersion solution was charged into a reactor equipped with an ultrasonic wave generator, a stirrer, a temperature regulator, a reflux condenser and a dropping funnel. Subsequently, an emulsified product previously prepared by mixing 10 g of benzyl methacrylate, 20 g of butyl methacrylate, 2 g of dicyclopentanyl dimethacrylate, 10 g of dimethylaminoethylmethylchloride methacrylate, 1 g of the above-described polymerizable surfactant, 0.5 g of 2,2'-azobis(2-methylpropionamidine)dihydrochloride and 100 g of water was gradually added dropwise to the reactor through the dropping funnel. After the completion of dropwise addition, a polymerization reaction was performed at 60° C. for 48 hours. The obtained coloring agent dispersion was adjusted to around a pH of 6 with disodium citrate and filtered through a 0.4-μm filter to remove coarse particles, thereby obtaining a dispersion solution of Coloring Agent 13. The average particle size was measured by a size analyzer Microtrack UPA 150 (manufactured by Leeds & Northrup) employing a laser doppler system and found to be 135 nm.

Coloring Agent 14

To 800 g of water, 100 g of C.I. Pigment Red 122 and 60 g of polymerizable surfactant dimethylaminoethylmethylchloride methacrylate were added. The resulting solution was irradiated with ultrasonic waves and further dispersed for about 2 hours by a sand mill (manufactured by Yasukawa Seisakusho). The obtained dispersion solution was charged into a reactor equipped with an ultrasonic wave generator, a stirrer, a temperature regulator, a reflux condenser and a dropping funnel. Subsequently, an emulsified product previously prepared by mixing 10 g of benzyl methacrylate, 20 g of butyl methacrylate, 2 g of dicyclopentanyl dimethacrylate, 10 g of N,N'-dimethylaminoethyl methacrylate, 1 g of the above-described polymerizable surfactant, 0.5 g of 2,2'-azobis(2-methylpropionamidine) dihydrochloride and 100 g of water was gradually added dropwise to the reactor through the dropping funnel. After the completion of dropwise addition, a polymerization reaction was performed at 60° C. for 48 hours. The obtained coloring agent dispersion was adjusted to around a pH of 6 with disodium citrate and filtered through a 0.4 μm filter to remove coarse particles, thereby obtaining a dispersion solution of Coloring Agent 14. The average particle size was measured by a size analyzer Microtrack UPA 150 (manufactured by Leeds & Northrup) employing a laser doppler system and found to be 130 nm.

Coloring Agent 15

In a reactor equipped with an ultrasonic wave generator, a stirrer, a temperature regulator, a reflux condenser and a dropping funnel, 50 g of C.I. Pigment Blue 15:3 and 30 g of polymerizable surfactant 2hydroxy-3-methacryloxypropyltrimethylammonium ammonium chloride were added to 500 g of water. The resulting solution was dispersed by irradiating ultrasonic waves thereon for 4 hours. Subsequently, 16 g of N,N'-dimethylaminopropylacrylamide, 3 g of 2-hydroxyethyl methacrylate, 5 g of divinylbenzene and 0.5 parts by weight of 2,2'-azobis(2-methylpropionamidine)dihydrochloride were further added and a polymerization reaction was performed at 60° C. for 48 hours. The obtained coloring agent dispersion was adjusted to around a pH of 6 with disodium citrate and filtered through a 0.4-μm filter to remove coarse particles, thereby obtaining a dispersion solution of Coloring Agent 15. The average particle size was measured by a size analyzer Microtrack UPA 150 (manufactured by Leeds & Northrup) employing a laser doppler system and found to be 120 nm.

Coloring Agent 16

To 800 g of water, 100 g of C.I. Pigment Yellow 151 and 60 g of polymerizable surfactant 2-hydroxy-3-methacryloxypropyltrimethylammonium chloride were added. The resulting solution was irradiated with ultrasonic waves and further dispersed for about 2 hours by a sand mill (manufactured by Yasukawa Seisakusho). The obtained dispersion solution was charged into a reactor equipped with an ultrasonic wave generator, a stirrer, a temperature regulator, a reflux condenser and a dropping funnel. Subsequently, an emulsified product previously prepared by mixing 10 g of dicyclopentenyl methacrylate, 20 g of butyl methacrylate, 2 g of 1,6-hexanediol dimethacrylate, 10 g of dimethylaminoethylbenzylchloride methacrylate, 1 g of the above-described polymerizable surfactant, 0.5 g of 2,2'-azobis(2-methylpropionamidine)dihydrochloride and 100 g of water was gradually added dropwise to the reactor through the dropping funnel. After the completion of dropwise addition, a polymerization reaction was performed at 60° C. for 48 hours. The obtained coloring agent dispersion was adjusted to around a pH of 6 with disodium citrate and filtered through a 0.4-μm filter to remove coarse particles, thereby obtaining a dispersion solution of Coloring Agent 16. The average particle size was measured by a size analyzer Microtrack UPA 150 (manufactured by Leeds & Northrup) employing a laser doppler system and found to be 115 nm.

Production of Polymer Fine Particle

Production of Anionic Polymer Fine Particle

Into a reactor equipped with a stirrer, a reflux condenser, a dropping unit, a thermometer and a nitrogen inlet tube, 200 ml of distilled water and 0.6 g of sodium dodecylbenzenesulfonate were charged. The temperature was elevated to 70° C. while stirring in a nitrogen atmosphere and 2 g of potassium persulfate was further added. On the other hand, 40 g of butyl acrylate, 50 g of styrene, 5 g of acrylic acid and 0.10 g of t-dodecylmercaptan were mixed and dissolved and the resulting solution was added dropwise to the reactor. After the reaction at 70° C. for 6 hours, the reaction system was cooled to ordinary temperature, aqueous ammonia was added as a neutralizer to adjust the pH, and the resulting solution was filtered through a filter to obtain a polymer emulsion having dispersed therein polymer fine particles. The average particle size was measured by a size analyzer Microtract UPA 150 (manufactured by Leeds & Northrup) employing a laser doppler system and found to be 80 nm.

Production of Cationic Polymer Fine Particle

Into a reactor equipped with a stirrer, a reflux condenser, a dropping unit, a thermometer and a nitrogen inlet tube, 200 ml of distilled water and 0.6 g of 2-hydroxy-3-methacryloxypropyltrimethylammonium chloride were charged. The temperature was elevated to 70° C. while stirring in a nitrogen atmosphere and 2 g of 2,2'-azobis(2-methylpropionamidine)dihydrochloride was further added. On the other hand, 20 g of butyl acrylate, 10 g of benzyl methacrylate, 5 g of N,N'-dimethylaminoethyl methacrylate and 3 g of 2-hydroxy-3-methacryloxypropyltrimethylammonium chloride were mixed and dissolved and the resulting solution was added dropwise to the reactor. After the reaction at 70° C. for 6 hours, the reaction system was cooled to ordinary temperature, aqueous ammonia was added as a neutralizer to adjust the pH, and the resulting solution was filtered through a filter to obtain a polymer emulsion having dispersed therein polymer fine particles. The average particle size was measured by a size analyzer Microtrack UPA 150 (manufactured by Leeds & Northrup) employing a laser doppler system and found to be 90 nm.

The inks having a composition shown in Tables 1 to 20 below are prepared by the following operation. An aqueous medium exclusive of the coloring agent is previously prepared and gradually added to the dispersion solution of coloring agent while stirring. After thorough stirring, an objective ink composition is obtained. To describe this more specifically, the black ink of Example 1 is used as an example. That is, 15 g of glycerol, 4 g of 2-pyrrolidone, 0.5 g of Orfin E1010 and 26.4 g of ion exchanged water are mixed and dissolved to prepare an aqueous medium. This aqueous medium is gradually added dropwise to 46.7 g of dispersion solution of Coloring Agent 1 while stirring and after thoroughly stirring and dispersing at room temperature (in the vicinity of 25° C.), the pH is adjusted to the range from 8 to 9 with an aqueous 10wt % potassium hydroxide solution, thereby obtaining an objective ink. At this time, an ultraviolet wave generator is preferably used in combination. The obtained ink is passed through a 3-$\mu$m membrane filter before use.

The black inks of Examples 1 to 4 and Examples 11 to 14 and the color inks of Examples 5 to 10 and Examples 15 to 20 each was adjusted to a pH of 6 to 7 with an aqueous 10 wt % disodium citrate solution. The color inks of Examples 1 to 4 and Examples 10 to 14 and the black inks of Examples 5 to 10 and Examples 15 to 20 each was adjusted to a pH of 8 to 9 with an aqueous 10% potassium hydroxide The ink compositions for use in the present invention and the ink sets (Examples) constructed by the ink composition are shown in Tables 1 to 20.

Examples 1

TABLE 1

| | | Example 1 | | | |
|---|---|---|---|---|---|
| | | Black Ink | Magenta Ink | Cyan Ink | Yellow Ink |
| Pigment | Coloring agent 1 | 7 | — | — | — |
| | Coloring agent 3 | — | 5 | — | — |
| | Coloring agent 4 | — | — | 5 | — |
| | Coloring agent 5 | — | — | — | 5 |
| Wetting agent | Glycerol | 15 | 15 | 15 | 15 |
| Polar solvent | 2-Pyrrolidone | 4 | 3 | 3 | 3 |
| Surfactant | Surfynol-465 | — | 1 | — | — |
| | Orfin E 1010 | — | — | 1 | 1 |
| pH Adjusting agent | Potassium hydroxide | — | opt. | opt. | opt. |
| | Disodium citrate | opt. | — | — | — |
| Ion-exchanged water | Ion-exchanged water | bal. | bal. | bal. | bal. |
| Surface tension (mN/m) | | 52 | 42 | 42 | 42 |

Example 2-1

TABLE 2

| | | Example 2-1 | | | |
|---|---|---|---|---|---|
| | | Black Ink | Magenta Ink | Cyan Ink | Yellow Ink |
| Pigment | Coloring agent 2 | 7 | — | — | — |
| | Coloring agent 6 | — | 8 | — | — |
| | Coloring agent 7 | — | — | 8 | — |
| | Coloring agent 8 | — | — | — | 8 |
| Wetting agent | Glycerol | 15 | 15 | 15 | 15 |

TABLE 2-continued

| | | Example 2-1 | | | |
|---|---|---|---|---|---|
| | | Black Ink | Magenta Ink | Cyan Ink | Yellow Ink |
| Polar solvent | 2-Pyrrolidone | 4 | 4 | 4 | — |
| | 1,3-Dimethyl-2-imidazolidinone | — | — | — | 4 |
| Penetrant | Triethylene glycol monobutyl ether | — | 3 | 3 | 3 |
| Surfactant | Surfynol 465 | — | 2 | — | 1 |
| | Orfin E 1010 | 0.2 | — | 2 | 1 |
| | Arcard 12-33 (quaternary ammonium-based cationic surfactant, produced by Lion) | — | — | — | — |
| pH Adjusting agent | Potassium hydroxide | — | opt. | opt. | opt. |
| | Disodium citrate | opt. | — | — | — |
| Ion-exchanged water | Ion-exchanged water | bal. | bal. | bal. | bal. |
| Surface tension (mN/m) | | 49 | 38 | 38 | 38 |

Examples 2-2 and 2-3

In Example 2-2, the penetrant "triethylene glycol monobutyl ether" used in Example 2-1 was replaced with "1,2-hexanediol" (addition amount: 3% by weight to each of the magenta, cyan and yellow inks). In Example 2-3, to the penetrant "triethylene glycol monobutyl ether" used in Example 2-1, "1,2-hexanediol" was further added (addition amount: 3% by weight to each of the magenta, cyan and yellow inks). Thus, each of these Examples is the same as Example 2-1 except for the penetrant.

Example 3-1

TABLE 3

| | | Example 3-1 | | | |
|---|---|---|---|---|---|
| | | Black Ink | Magenta Ink | Cyan Ink | Yellow Ink |
| Pigment | Coloring agent 2 | 7 | — | — | — |
| | Coloring agent 6 | — | 8 | — | — |
| | Coloring agent 7 | — | — | 8 | — |
| | Coloring agent 8 | — | — | — | 8 |
| Wetting agent | Glycerol | 15 | 15 | 15 | 15 |
| Polar solvent | 2-Pyrrolidone | 4 | 4 | 4 | — |
| | 1,3-Dimethyl-2-imidazolidinone | — | — | — | 4 |
| Penetrant | Triethylene glycol monobutyl ether | — | 3 | 3 | 3 |
| Surfactant | Surfynol 465 | — | 2 | — | 1 |
| | Orfin E 1010 | — | — | 2 | 1 |
| | Arcard 12-33 (quaternary ammonium-based cationic surfactant, produced by Lion) | 0.2 | — | — | — |
| pH Adjusting agent | Potassium hydroxide | — | opt. | opt. | opt. |
| | Disodium citrate | opt. | — | — | — |
| Ion-exchanged water | Ion-exchanged water | bal. | bal. | bal. | bal. |
| Surface tension (mN/m) | | 49 | 38 | 38 | 35 |

Examples 3-2 and 3-3

In Example 3-2, the penetrant "triethylene glycol monobutyl ether" used in Example 3-1 was replaced with "1,2-hexanediol" (addition amount: 3% by weight to each of the magenta, cyan and yellow inks). In Example 3-3, to the penetrant "triethylene glycol monobutyl ether" used in Example 3-1, "1,2-hexanediol" was further added (addition amount: 3% by weight to each of the magenta, cyan and yellow inks). Thus, each of these Examples is the same as Example 3-1 except for the penetrant.

Example 4-1

TABLE 4

| | | Example 4-1 | | | |
|---|---|---|---|---|---|
| | | Black Ink | Magenta Ink | Cyan Ink | Yellow Ink |
| Pigment | Coloring agent 1 | 7 | — | — | — |
| | Coloring agent 6 | — | 8 | — | — |
| | Coloring agent 7 | — | — | 8 | — |
| | Coloring agent 8 | — | — | — | 8 |
| Wetting agent | Glycerol | 15 | 15 | 15 | 15 |
| Polar solvent | 2-Pyrrolidone | 4 | 4 | 4 | — |
| | 1,3-Dimethyl-2-imidazolidinone | — | | | 4 |
| Penetrant | Triethylene glycol monobutyl ether | — | 3 | 3 | 3 |
| Surfactant | Surfynol 465 | — | 2 | — | 1 |
| | Orfin E 1010 | — | — | 2 | 1 |
| pH Adjusting agent | Potassium hydroxide | — | opt. | opt. | opt. |
| | Disodium citrate | opt. | — | — | — |
| Ion-exchanged water | Ion-exchanged water | bal. | bal. | bal. | bal. |
| Surface tension (mN/m) | | 52 | 38 | 38 | 38 |

Examples 4-2 and 4-3

In Example 4-2, the penetrant "triethylene glycol monobutyl ether" used in Example 4-1 was replaced with "1,2-hexanediol" (addition amount: 3% by weight to each of the magenta, cyan and yellow inks). In Example 4-3, to the penetrant "triethylene glycol monobutyl ether" used in Example 4-1, "1,2-hexanediol" was further added (addition amount: 3% by weight to each of the magenta, cyan and yellow inks). Thus, each of these Examples is the same as Example 4-1 except for the penetrant.

Example 5

TABLE 5

| | | Example 5 | | | |
|---|---|---|---|---|---|
| | | Black Ink | Magenta Ink | Cyan Ink | Yellow Ink |
| Pigment | Coloring agent 9 | 7 | — | — | — |
| | Coloring agent 11 | — | 5 | — | — |
| | Coloring agent 12 | — | — | 5 | — |
| | Coloring agent 13 | — | — | — | 5 |
| Wetting agent | Glycerol | 15 | 15 | 15 | 15 |
| Polar solvent | 2-Pyrrolidone | 4 | 3 | 3 | 3 |
| Surfactant | Surfynol 465 | — | 1 | — | — |
| | Orfin E 1010 | — | — | 1 | 1 |
| pH Adjusting agent | Potassium hydroxide | opt. | — | — | — |
| | Disodium citrate | — | opt. | opt. | opt. |
| Ion-exchanged water | Ion exchanged water | bal. | bal. | bal. | bal. |
| Surface tension (mN/m) | | 52 | 42 | 42 | 42 |

Example 6

TABLE 6

| | | Example 6 | | | |
|---|---|---|---|---|---|
| | | Black Ink | Magenta Ink | Cyan Ink | Yellow Ink |
| Pigment | Coloring agent 9 | 7 | — | — | — |
| | Coloring agent 11 | — | 5 | — | — |
| | Coloring agent 12 | — | — | 5 | — |
| | Coloring agent 13 | — | — | — | 5 |
| Wetting agent | Glycerol | 15 | 15 | 15 | 15 |
| Polar solvent | 2-Pyrrolidone | 4 | 3 | 3 | 3 |
| Surfactant | Arcard 12-33 (quaternary ammonium-based cationic surfactant, produced by Lion) | — | 1 | 1 | 1 |
| pH Adjusting agent | Potassium hydroxide | opt. | — | — | — |
| | Disodium citrate | — | opt. | opt. | opt. |
| Ion-exchanged water | Ion-exchanged water | bal. | bal. | bal. | bal. |
| Surface tension (mN/m) | | 52 | 42 | 42 | 42 |

Example 7-1

TABLE 7

| | | Example 7-1 | | | |
|---|---|---|---|---|---|
| | | Black Ink | Magenta Ink | Cyan Ink | Yellow Ink |
| Pigment | Coloring agent 10 | 7 | — | — | — |
| | Coloring agent 14 | — | 8 | — | — |
| | Coloring agent 15 | — | — | 8 | — |
| | Coloring agent 16 | — | — | — | 8 |
| Wetting agent | Glycerol | 15 | 15 | 15 | 15 |
| Polar solvent | 2-Pyrrolidone | 4 | 4 | 4 | — |
| | 1,3-Dimethyl-2-imidazolidinone | | | — | 4 |
| Penetrant | Triethylene glycol monobutyl ether | — | 3 | 3 | 3 |
| Surfactant | Surfynol 465 | 0.2 | 2 | — | 1 |
| | Orfin E 1010 | — | — | 2 | 1 |
| pH Adjusting agent | Potassium hydroxide | opt. | — | — | — |
| | Disodium citrate | — | opt. | opt. | opt. |
| Ion-exchanged water | Ion exchanged water | bal. | bal. | bal. | bal. |
| Surface tension (mN/m) | | 49 | 38 | 38 | 38 |

Examples 7-2 and 7-3

In Example 7-2, the penetrant "triethylene glycol monobutyl ether" used in Example 7-1 was replaced with "1,2-hexanediol" (addition amount: 3% by weight to each of the magenta, cyan and yellow inks). In Example 7-3, to the penetrant "triethylene glycol monobutyl ether" used in Example 7-1, "1,2-hexanediol" was further added (addition amount: 3% by weight to each of the magenta, cyan and yellow inks). Thus, each of these Examples is the same as Example 7 1 except for the penetrant.

Example 8-1

TABLE 8

| | | Example 8-1 | | | |
|---|---|---|---|---|---|
| | | Black Ink | Magenta Ink | Cyan Ink | Yellow Ink |
| Pigment | coloring agent 10 | 7 | — | — | — |
| | coloring agent 14 | — | 8 | — | — |
| | coloring agent 15 | — | — | 8 | — |
| | coloring agent 16 | — | — | — | 8 |
| Wetting agent | glycerol | 15 | 15 | 15 | 15 |
| Polar solvent | 2-Pyrrolidone | 4 | 4 | 4 | — |
| | 1,3-Dimethyl-2-imidazolidinone | — | — | — | 4 |
| Penetrant | Triethylene glycol monobutyl ether | — | 3 | 3 | 3 |
| Surfactant | Surfynol 465 | 0.2 | — | — | — |
| | Orfin E 1010 | — | — | — | — |
| | Arcard 12-33 (quaternary ammonium-based cationic surfactant, produced by Lion) | — | 2 | 2 | 2 |
| pH Adjusting agent | Potassium hydroxide | opt. | — | — | — |
| | Disodium citrate | — | opt. | opt. | opt. |
| Ion-exchanged water | Ion-exchanged water | bal. | bal. | bal. | bal. |
| Surface tension (mN/m) | | 49 | 38 | 38 | 38 |

Examples 8-2 and 8-3

In Example 8-2, the penetrant "triethylene glycol monobutyl ether" used in Example 8-1 was replaced with "1,2-hexanediol" (addition amount: 3% by weight to each of the magenta, cyan and yellow inks). In Example 8-3, to the penetrant "triethylene glycol monobutyl ether" used in Example 8-1, "1,2-hexanediol" was further added (addition amount: 3% by weight to each of the magenta, cyan and yellow inks). Thus, each of these Examples is the same as Example 8-1 except for the penetrant.

Example 9-1

TABLE 9

| | | Example 9-1 | | | |
|---|---|---|---|---|---|
| | | Black Ink | Magenta Ink | Cyan Ink | Yellow Ink |
| Pigment | coloring agent 9 | 7 | — | — | — |
| | coloring agent 14 | — | 8 | — | — |
| | coloring agent 15 | — | — | 8 | — |
| | coloring agent 16 | — | — | — | 8 |
| Wetting agent | glycerol | 15 | 15 | 15 | 15 |
| Polar solvent | 2-Pyrrolidone | 4 | 4 | 4 | — |
| | 1,3-Dimethyl-2-imidazolidinone | — | — | — | 4 |
| Penetrant | Triethylene glycol monobutyl ether | — | 3 | 3 | 3 |
| Surfactant | Surfynol 465 | — | 2 | — | 1 |
| | Orfin E 1010 | — | — | 2 | 1 |
| pH Adjusting agent | Potassium hydroxide | opt. | — | — | — |
| | Disodium citrate | — | opt. | opt. | opt. |
| Ion-exchanged water | Ion exchanged water | bal. | bal. | bal. | bal. |
| Surface tension (mN/m) | | 52 | 38 | 38 | 38 |

Example 9-2 and 9-3

In Example 9-2, the penetrant "triethylene glycol monobutyl ether" used in Example 9-1 was replaced with "1,2-hexanediol" (addition amount: 3% by weight to each of the magenta, cyan and yellow inks). In Example 9-3, to the penetrant "triethylene glycol monobutyl ether" used in Example 9-1, "1,2-hexanediol" was further added (addition amount: 3% by weight to each of the magenta, cyan and yellow inks). Thus, each of these Examples is the same as Example 9-1 except for the penetrant.

Example 10-1

TABLE 10

| | | Example 10-1 | | | |
|---|---|---|---|---|---|
| | | Black Ink | Magenta Ink | Cyan Ink | Yellow Ink |
| Pigment | Coloring agent 9 | 7 | — | — | — |
| | Coloring agent 14 | — | 8 | — | — |
| | Coloring agent 15 | — | — | 8 | — |
| | Coloring agent 16 | — | — | — | 8 |
| Wetting agent | Glycerol | 15 | 15 | 15 | 15 |
| Polar solvent | 2-Pyrrolidone | 4 | 4 | 4 | — |
| | 1,3-Dimethyl-2-imidazolidinone | — | — | — | 4 |
| Penetrant | Triethylene glycol monobutyl ether | — | 3 | 3 | 3 |
| Surfactant | Arcard 12-33 (quaternary ammonium-based cationic surfactant, produced by Lion) | — | 2 | 2 | 2 |
| pH Adjusting agent | Potassium hydroxide | opt. | — | — | — |
| | Disodium citrate | — | opt. | opt. | opt. |
| Ion-exchanged water | Ion-exchanged water | bal. | bal. | bal. | bal. |
| Surface tension (mN/m) | | 52 | 38 | 38 | 38 |

Examples 10-2 and 10-3

In Example 10-2, the penetrant "triethylene glycol monobutyl ether" used in Example 10-1 was replaced with "1,2-hexanediol" (addition amount: 3% by weight to each of the magenta, cyan and yellow inks). In Example 10-3, to the penetrant "triethylene glycol monobutyl ether" used in Example 10-1, "1,2-hexanediol" was further added (addition amount: 3% by weight to each of the magenta, cyan and yellow inks). Thus, each of these Examples is the same as Example 10-1 except for the penetrant.

TABLE 11

| | | Example 11-1 | | | |
|---|---|---|---|---|---|
| | | Black Ink | Magenta Ink | Cyan Ink | Yellow Ink |
| Pigment | Coloring agent 1 | 7 | — | — | — |
| | Coloring agent 3 | — | 5 | — | — |
| | Coloring agent 4 | — | — | 5 | — |
| | Coloring agent 6 | — | — | — | 5 |
| Polymer fine particle | anionic polymer fine particle | — | 3 | 3 | 3 |
| | cationic polymer fine particle | 3 | — | — | — |
| Wetting agent | Glycerol | 15 | 15 | 15 | 16 |
| Polar solvent | 2-Pyrrolidone | 4 | 3 | 3 | 3 |
| Surfactant | Surfynol 465 | — | 1 | — | — |
| | Orfin E 1010 | — | — | 1 | 1 |
| pH Adjusting agent | Potassium hydroxide | — | opt. | opt. | opt. |
| | Disodium citrate | opt. | — | — | — |
| Ion-exchanged water | Ion-exchanged water | bal. | bal. | bal. | bal. |
| Surface tension (mN/m) | | 52 | 42 | 42 | 42 |

Example 11-2

In Example 11-2, to the ink set of Example 11-1, "maltitol" was further added (addition amount: 3% by weight to each of the magnets, cyan and yellow inks) as a saccharide.

Example 12-1

TABLE 12

|  |  | Example 12-1 | | | |
|---|---|---|---|---|---|
|  |  | Black Ink | Magenta Ink | Cyan Ink | Yellow Ink |
| Pigment | Coloring agent 2 | 7 | — | — | — |
|  | Coloring agent 6 | — | 8 | — | — |
|  | Coloring agent 7 | — | — | 8 | — |
|  | Coloring agent 8 | — | — | — | 8 |
| Polymer fine particle | Anionic polymer fine particle | — | 3 | 3 | 3 |
|  | Cationic polymer fine particle | 3 | — | — | — |
| Wetting agent | Glycerol | 15 | 15 | 15 | 15 |
| Polar solvent | 2-Pyrrolidone | 4 | 4 | 4 | — |
|  | 1,3-Dimethyl-2-imidazolidinone | — | — | — | 4 |
| Penetrant | Triethylene glycol monobutyl ether | — | 3 | 3 | 3 |
| Surfactant | Surfynol 465 | — | 2 | — | 1 |
|  | Orfin E 1010 | 0.2 | — | 2 | 1 |
|  | Arcard 12-33 (quaternary ammonium-based cationic surfactant, produced by Lion) | — | — | — | — |
| pH Adjusting agent | Potassium hydroxide | — | opt. | opt. | opt. |
|  | Disodium citrate | opt. | — | — | — |
| Ion-exchanged water | Ion-exchanged water | bal. | bal. | bal. | bal. |
| Surface tension (mN/m) |  | 49 | 38 | 38 | 38 |

Examples 12-2, 12-3 and 12-4

In Example 12-2, the penetrant "triethylene glycol monobutyl ether" used in Example 12-1 was replaced with "1,2-hexanediol" (addition amount: 3% by weight to each of the magenta, cyan and yellow inks). In Example 12-3, to the penetrant "triethylene glycol monobutyl ether" used in Example 12-1, "1,2-hexanediol" was further added (addition amount: 3% by weight to each of the magenta, cyan and yellow inks). Thus, each of these Examples is the same as Example 12 1 except for the penetrant.

In Example 12-4, to the ink set of Example 12-1, "maltitol" was further added (addition amount: 3% by weight to each of the magenta, cyan and yellow inks) as a saccharide.

Example 13-1

TABLE 13

|  |  | Example 13-1 | | | |
|---|---|---|---|---|---|
|  |  | Black Ink | Magenta Ink | Cyan Ink | Yellow Ink |
| Pigment | Coloring agent 2 | 7 | — | — | — |
|  | Coloring agent 6 | — | 8 | — | — |
|  | Coloring agent 7 | — | — | 8 | — |
|  | Coloring agent 8 | — | — | — | 8 |
| Polymer fine particle | Anionic polymer fine particle | — | 3 | 3 | 3 |
|  | Cationic polymer fine particle | 3 | — | — | — |
| Wetting agent | Glycerol | 15 | 15 | 15 | 15 |
| Polar solvent | 2-Pyrrolidone | 4 | 4 | 4 | — |
|  | 1,3-Dimethyl-2-imidazolidinone | — | — | — | 4 |
| Penetrant | Triethylene glycol monobutyl ether | — | 3 | 3 | 3 |
| Surfactant | Surfynol 465 | — | 2 | — | 1 |
|  | Orfin E 1010 | — | — | 2 | 1 |
|  | Arcard 12-33 (quaternary ammonium-based cationic surfactant, produced by Lion) | 0.2 | — | — | — |
| pH Adjusting agent | Potassium hydroxide | — | opt. | opt. | opt. |
|  | Disodium citrate | opt. | — | — | — |
| Ion-exchanged water | Ion-exchanged water | bal. | bal. | bal. | bal. |
| Surface tension (mN/m) |  | 49 | 38 | 38 | 38 |

Examples 13-2, 13-3 and 13-4

In Example 13-2, the penetrant "triethylene glycol monobutyl ether" used in Example 13-1 was replaced with "1,2-hexanediol" (addition amount: 3% weight to each of the magenta, cyan and yellow inks). In Example 13-3, to the penetrant "triethylene glycol monobutyl ether" used in Example 13-1, "1,2-hexanediol" was further added (addition amount: 3% by weight to each of the magenta, cyan and yellow inks). Thus, each of these Examples is the same as Example 13 1 except for the penetrant.

In Example 13-4, to the ink set of Example 13-1, "maltitol" was further added (addition amount: 3% by weight to each of the magenta, cyan and yellow inks) as a saccharide.

Example 14-1

TABLE 14

|  |  | Example 14-1 | | | |
|---|---|---|---|---|---|
|  |  | Black Ink | Magenta Ink | Cyan Ink | Yellow Ink |
| Pigment | Coloring agent 1 | 7 | — | — | — |
|  | Coloring agent 6 | — | 8 | — | — |
|  | Coloring agent 7 | — | — | 8 | — |
|  | Coloring agent 8 | — | — | — | 8 |
| Polymer fine particle | anionic polymer fine particle | — | 3 | 3 | 3 |
|  | cationic polymer fine particle | 3 | — | — | — |
| Wetting agent | Glycerol | 15 | 15 | 15 | 15 |
| Polar solvent | 2-Pyrrolidone | 4 | 4 | 4 | — |
|  | 1,3-Dimethyl-2-imidazolidinone | — | — | — | 4 |
| Penetrant | Triethylene glycol monobutyl ether | — | 3 | 3 | 3 |
| Surfactant | Surfynol 465 | — | 2 | — | 1 |
|  | Orfin E 1010 | — | — | 2 | 1 |
| pH Adjusting agent | Potassium hydroxide | — | opt. | opt. | opt. |
|  | Disodium citrate | opt. | — | — | — |
| Ion-exchanged water | Ion-exchanged water | bal. | bal. | bal. | bal. |
| Surface tension (mN/m) |  | 52 | 30 | 38 | 38 |

Examples 14-2, 14-3 and 14-4

In Example 14-2, the penetrant "triethylene glycol monobutyl ether" used in Example 12-1 was replaced with "1,2-hexanediol" (addition amount: 3% by weight to each of the magenta, cyan and yellow inks). In Example 14-3, to the penetrant "triethylene glycol monobutyl ether" used in Example 12-1, "1,2-hexanediol" was further added (addition amount: 3% by weight to each of the magenta, cyan and yellow inks). Thus, each of these Examples is the same as Example 14-1 except for the penetrant.

In Example 14-4, to the ink set of Example 14-1, "maltitol" was further added (addition amount: 3% by weight to each of the magenta, cyan and yellow inks) as a saccharide.

Example 15-1

TABLE 15

|  |  | Example 15-1 | | | |
|---|---|---|---|---|---|
|  |  | Black Ink | Magenta Ink | Cyan Ink | Yellow Ink |
| Pigment | Coloring agent 9 | 7 | — | — | — |
|  | Coloring agent 11 | — | 5 | — | — |
|  | Coloring agent 12 | — | — | 5 | — |
|  | Coloring agent 13 | — | — | — | 5 |
| Polymer fine particle | Anionic polymer fine particle | 3 | — | — | — |
|  | Cationic polymer fine particle | — | 3 | 3 | 3 |
| Wetting agent | Glycerol | 15 | 15 | 15 | 15 |
| Polar solvent | 2-Pyrrolidone | 4 | 3 | 3 | 3 |
| Surfactant | Surfynol 465 | — | 1 | — | — |
|  | Orfin E 1010 | — | — | 1 | 1 |
| pH Adjusting agent | Potassium hydroxide | opt. | — | — | — |
|  | Disodium citrate | — | opt. | opt. | opt. |
| Ion-exchanged water | Ion-exchanged water | bal. | bal. | bal. | bal. |
| Surface tension (mN/m) |  | 52 | 42 | 42 | 42 |

Example 15-2

In Example 15-2, to the ink set of Example 15-1, "maltitol" was further added (addition amount: 3% by weight to each of the magenta, cyan and yellow inks) as a saccharide.

TABLE 16

|  |  | Example 16-1 | | | |
|---|---|---|---|---|---|
|  |  | Black Ink | Magenta Ink | Cyan Ink | Yellow Ink |
| Pigment | Coloring agent 9 | 7 | — | — | — |
|  | Coloring agent 11 | — | 5 | — | — |
|  | Coloring agent 12 | — | — | 5 | — |
|  | Coloring agent 13 | — | — | — | 5 |
| Polymer fine particle | Anionic polymer fine particle | 3 | — | — | — |
|  | Cationic polymer fine particle | — | 3 | 3 | 3 |
| Wetting agent | Glycerol | 15 | 15 | 15 | 15 |
| Polar solvent | 2-Pyrrolidone | 4 | 3 | 3 | 3 |
| Surfactant | Arcard 12-33 (quaternary ammonium-based cationic surfactant, produced by Lion) | — | 1 | 1 | 1 |
| pH Adjusting agent | Potassium hydroxide | opt. | — | — | — |
|  | Disodium citrate | — | opt. | opt. | opt. |

TABLE 16-continued

|  |  | Example 16-1 | | | |
|---|---|---|---|---|---|
|  |  | Black Ink | Magenta Ink | Cyan Ink | Yellow Ink |
| Ion-exchanged water | Ion-exchanged water | bal. | bal. | bal. | bal. |
| Surface tension (mN/m) |  | 52 | 42 | 42 | 42 |

Example 16-2

In Example 16-2, to the ink set of Example 16-1, "maltitol" was further added (addition amount: 3% by weight to each of the magenta, cyan and yellow inks) as a saccharide.

Examples 17-1

TABLE 17

|  |  | Example 17-1 | | | |
|---|---|---|---|---|---|
|  |  | Black Ink | Magenta Ink | Cyan Ink | Yellow Ink |
| Pigment | Coloring agent 10 | 7 | — | — | — |
|  | Coloring agent 14 | — | 8 | — | — |
|  | Coloring agent 15 | — | — | 8 | — |
|  | Coloring agent 16 | — | — | — | 8 |
| Polymer fine particle | Anionic polymer fine particle | 3 | — | — | — |
|  | Cationic polymer fine particle | — | 3 | 3 | 3 |
| Wetting agent | Glycerol | 15 | 15 | 15 | 15 |
| Polar solvent | 2-Pyrrolidone | 4 | 4 | 4 | — |
|  | 1,3-Dimethyl-2-imidazolidinone | — | — | — | 4 |
| Penetrant | Triethylene glycol monobutyl ether | — | 3 | 3 | 3 |
| Surfactant | Surfynol 465 | 0.2 | 2 | — | 1 |
|  | Orfin E 1010 | — | — | 2 | 1 |
| pH Adjusting agent | Potassium hydroxide | opt. | — | — | — |
|  | Disodium citrate | — | opt. | opt. | opt. |
| Ion-exchanged water | Ion-exchanged water | bal. | bal. | bal. | bal. |
| Surface tension (mN/m) |  | 49 | 38 | 38 | 38 |

Examples 17-2, 17-3 and 17-4

In Example 17-2, the penetrant "triethylene glycol monobutyl ether" used in Example 17-1 was replaced with "1,2-hexanediol" (addition amount: 3% by weight to each of the magenta, cyan and yellow inks). In Example 17-3, to the penetrant "triethylene glycol monobutyl ether" used in Example 17-1, "1,2-hexanediol" was further added (addition amount: 3% by weight to each of the magenta, cyan and yellow inks). Thus, each of these Examples is the same as Example 17-1 except for the penetrant.

In Example 17-4, to the ink set of Example 17-1, "maltitol" was further added (addition amount: 3% by weight to each of the magenta, cyan and yellow inks) as a saccharide.

Example 18-1

TABLE 18

| | | Example 18-1 | | | |
|---|---|---|---|---|---|
| | | Black Ink | Magenta Ink | Cyan Ink | Yellow Ink |
| Pigment | Coloring agent 10 | 7 | — | — | — |
| | Coloring agent 14 | — | 8 | — | — |
| | Coloring agent 15 | — | — | 8 | — |
| | Coloring agent 16 | — | — | — | 8 |
| Polymer fine particle | anionic polymer fine particle | 3 | — | — | — |
| | cationic polymer fine particle | — | 3 | 3 | 3 |
| Wetting agent | Glycerol | 15 | 15 | 15 | 15 |
| Polar solvent | 2-Pyrrolidone | 4 | 4 | 4 | — |
| | | — | — | — | 4 |
| Penetrant | Triethylene glycol monobutyl ether | — | 3 | 3 | 3 |
| Surfactant | Surfynol 465 | 0.2 | — | — | — |
| | Orfin E 1010 | — | — | — | — |
| | Arcard 12-33 (quaternary ammonium-based cationic surfactant, produced by Lion) | — | 2 | 2 | 2 |
| pH Adjusting agent | Potassium hydroxide | opt. | — | — | — |
| | Disodium citrate | — | opt. | opt. | opt. |
| Ion-exchanged water | Ion-exchanged water | bal. | bal. | bal. | bal. |
| Surface tension (mN/m) | | 49 | 38 | 38 | 38 |

Examples 18-2, 18-3 and 18-4

In Example 18-2, the penetrant "triethylene glycol monobutyl ether" used in Example 18-1 was replaced with "1,2-hexanediol" (addition amount: 3% by weight to each of the magenta, cyan and yellow inks). In Example 18-3, to the penetrant "triethylene glycol monobutyl ether" used in Example 18-1, "1,2-hexanediol" was further added (addition amount: 3% by weight to each of the magenta, cyan and yellow inks). Thus, each of these Examples is the same as Example 18-1 except for the penetrant.

In Example 18-4, to the ink set of Example 18-1, "maltitol" was further added (addition amount: 3% by weight to each of the magenta, cyan and yellow inks) as a saccharide.

Example 19-1

TABLE 19

| | | Example 19-1 | | | |
|---|---|---|---|---|---|
| | | Black Ink | Magenta Ink | Cyan Ink | Yellow Ink |
| Pigment | Coloring agent 9 | 7 | — | — | — |
| | Coloring agent 14 | — | 8 | — | — |
| | Coloring agent 15 | — | — | 8 | — |
| | Coloring agent 16 | — | — | — | 8 |
| Polymer fine particle | Anionic polymer fine particle | 3 | — | — | — |
| | Cationic polymer fine particle | — | 3 | 3 | 3 |
| Wetting agent | Glycerol | 15 | 15 | 15 | 15 |
| Polar solvent | 2-Pyrrolidone | 4 | 4 | 4 | — |
| | 1,3-Dimethyl-2-imidazolidinone | — | — | — | 4 |
| Penetrant | Triethylene glycol monobutyl ether | — | 3 | 3 | 3 |
| Surfactant | Surfynol 465 | — | 2 | — | 1 |
| | Orfin E 1010 | — | — | 2 | 1 |
| pH Adjusting agent | Potassium hydroxide | opt. | — | — | — |
| | Disodium citrate | — | opt. | opt. | opt. |
| Ion-exchanged water | Ion-exchanged water | bal. | bal. | bal. | bal. |
| Surface tension (mN/m) | | 52 | 38 | 38 | 38 |

Examples 19-2, 19-3 and 19-4

In Example 19-2, the penetrant "triethylene glycol monobutyl ether" used in Example 19-1 was replaced with "1,2-hexanediol" (addition amount: 3% by weight to each of the magenta, cyan and yellow inks). In Example 19-3, to the penetrant "triethylene glycol monobutyl ether" used in Example 19-1, "1,2-hexanediol" was further added (addition amount: 3% by weight to each of the magenta, cyan and yellow inks). Thus, each of these Examples is the same as Example 19-1 except for the penetrant.

In Example 19-4, to the ink set of Example 19-1, "maltitol" was further added (addition amount: 3% by weight to each of the magenta, cyan and yellow inks) as a saccharide.

Examples 20-1

TABLE 20

| | | Example 20-1 | | | |
|---|---|---|---|---|---|
| | | Black Ink | Magenta Ink | Cyan Ink | Yellow Ink |
| Pigment | Coloring agent 9 | 7 | — | — | — |
| | Coloring agent 14 | — | 8 | — | — |
| | Coloring agent 15 | — | — | 8 | — |
| | Coloring agent 16 | — | — | — | 8 |
| Polymer fine particle | Anionic polymer fine particle | 3 | — | — | — |
| | Cationic polymer fine particle | — | 3 | 3 | 3 |
| Wetting agent | Glycerol | 15 | 15 | 15 | 15 |
| Polar solvent | 2-Pyrrolidone | 4 | 4 | 4 | — |
| | 1,3-Dimethyl-2-imidazolidinone | — | — | — | 4 |
| Penetrant | Triethylene glycol monobutyl ether | — | 3 | 3 | 3 |
| Surfactant | Arcard 12-33 (quaternary ammonium-based cationic surfactant, produced by Lion) | — | 2 | 2 | 2 |
| pH Adjusting agent | Potassium hydroxide | opt. | — | — | — |
| | Disodium citrate | — | opt. | opt. | opt. |
| Ion-exchanged water | Ion-exchanged water | bal. | bal. | bal. | bal. |
| Surface tension (mN/m) | | 52 | 38 | 38 | 38 |

Examples 20-2, 20-3 AND 20-4

In Example 20-2, the penetrant "triethylene glycol monobutyl ether" used in Example 20-1 was replaced with "1,2-hexanediol" (addition amount: 3% by weight to each of the magenta, cyan and yellow inks). In Example 20-3, to the penetrant "triethylene glycol monobutyl ether" used in Example 20-1, "1,2-hexanediol" was further added (addition amount: 3% by weight to each of the magenta, cyan and yellow inks). Thus, each of these Examples is the same as Example 20-1 except for the penetrant.

In Example 20-4, to the ink set of Example 20-1, "maltitol" was further added (addition amount: 3% by weight to each of the magenta, cyan and yellow inks) as a saccharide.

All the numerical values shown in Tables 1 to 20 are in terms of "% by weight". The surface tension of each ink was measured by an automatic surface tension balance (manufacture by Kyowa Kaimen Kagaku) and the results are shown in Tables 1 to 20.

COMPARATIVE EXAMPLE 1

The ink set of Comparative Example 1 was prepared from the following black ink, magenta ink, cyan ink and yellow ink.

Black Ink

In a sand mill, 7% by weight of carbon black (Laben C, produced by Colombian Carbon), 1.4% by weight of ammonium salt (molecular weight: 7,000, polymer component.: 38%) of styrene-acrylic acid copolymer, and 15% by weight of ion exchanged water were mixed and dispersed for 2 hours. Previously, 10% by weight of glycerol, 8% by weight of ethylene glycol, 0.9% by weight of triethanolamine and the balance of ion exchanged water were added to prepare an ink solvent. This solvent was gradually added dropwise to the dispersion solution prepared above while stirring and thoroughly stirred at an ordinary temperature. The resulting dispersion solution was passed through a 1-µm membrane filter to obtain an ink composition.

Magenta Ink

In a sand mill, 8% by weight of C.I. Pigment Red 122, 1.6% by weight of ammonium salt (molecular weight: 7,000, polymer component: 38%) of styrene-acrylic acid copolymer, and 15% by weight of ion exchanged water were mixed and dispersed for 2 hours. Previously, 10% by weight of glycerol, 8% by weight of ethylene glycol, 2% by weight of 2-pyrrolidone, 1% by weight of nonionic surfactant Noigen EA160 (produced by Daiichi Seiyaku Kogyo), 5% by weight of triethylene glycol monobutyl ether, 0.1% by weight of potassium hydroxide and the balance of ion exchanged water were added to prepare an ink solvent. This solvent was gradually added dropwise to the dispersion solution prepared above while stirring and thoroughly stirred at an ordinary temperature. The resulting dispersion solution was passed through a 1-µm membrane filter to obtain an ink composition.

Cyan Ink and Yellow Ink

In the same manner, a cyan ink (pigment, C.I. Pigment Blue 15:3) and a yellow ink (pigment: C.I. Pigment Yellow 151) were prepared.

Ink Evaluation Test

The inks of Examples 1 to 10 and Comparative Example 1 each was subjected to the following evaluation test (Evaluations 1 to 5).

A printed matter obtained by ejecting liquid droplets of ink composition and attaching the liquid droplet to a recording medium to obtain a recorded material was evaluated. More specifically, the ink sets of Examples 1 to 10 and Comparative Example 1 each was mounted on an ink jet printer PM-760C (manufactured by Seiko Epson Corp.) and printing was performed on the following printing paper sheets (plain paper) at 720 dpi×720 dpi.

Xerox P (produced by Xerox Corp.)
Ricopy 6200 (produced by Ricoh Co., Ltd.)
Xerox 4024 (produced by Xerox Corp.)
Neenah Bond (produced by Kimberly-Clark)
Xerox R (recycled paper, produced by Xerox Corp.)

Evaluation 1: Printing Quality (Blurring)

The ink sets of Examples 1 to 10 and Comparative Example 1 each was mounted on an ink jet printer PM-760C and after attaching yellow ink to the printing paper sheet (plain paper) shown above, black ink was attached thereon to print letters (24 alphabetic letters). The degree of blurring of letters was evaluated according to the following criteria. The same evaluation was performed also for magenta ink and cyan ink.

A: Less than 240 occurrences of blurring
B: From 240 to less than 500 occurrences of blurring
C: 500 or more occurrences of blurring The evaluation results are shown in Table 21.

Evaluation 2: Color Bleeding

Simultaneously with the printing on the above-described printing paper sheets using color ink (cyan ink, magenta ink or yellow ink) at 100% duty in an ink jet printer PM-760C, letters were printed by black ink. The presence or absence or non-uniform color mixing at the boundary portion of a letter was evaluated according to the following criteria.

A: No color mixing and clear boundary.
B: Color mixing was generated like whiskers.
C: Color mixing was generated so heavily as to make the contour of a letter indistinguishable.

The evaluation results are shown in Table 21.

Evaluation 3: OD Value

In the same manner as in Evaluation 1, yellow ink was attached to the above-described printing paper sheets (plain paper) and black ink was attached thereon to perform a solid printing. The reflection OD value in the solid part was measured by a Macbeth densitometer PCM II (manufactured by Macbeth) and evaluated according to the following criteria.

A: OD value of 1.4 or more
B: OD value of 1.2 to less than 1.4
C: OD value of less than 1.2

The evaluation results are shown in Table 21.

TABLE 21

| | Evaluation 1, printing quality (blurring) | Evaluation 2, color bleeding | Evaluation 3, OD value |
|---|---|---|---|
| Example 1 | A | A | A |
| Example 2-1 | A | A | A |
| Example 2-2 | A | A | A |
| Example 2-3 | A | A | A |
| Example 3-1 | A | A | A |
| Example 3-2 | A | A | A |
| Example 3-3 | A | A | A |
| Example 4-1 | A | A | A |
| Example 4-2 | A | A | A |
| Example 4-3 | A | A | A |
| Example 5 | A | A | A |
| Example 6 | A | A | A |
| Example 7-1 | A | A | A |
| Example 7-2 | A | A | A |
| Example 7-3 | A | A | A |
| Example 8-1 | A | A | A |
| Example 8-2 | A | A | A |
| Example 8-3 | A | A | A |
| Example 9-1 | A | A | A |
| Example 9-2 | A | A | A |
| Example 9-3 | A | A | A |
| Example 10-1 | A | A | A |
| Example 10-2 | A | A | A |
| Example 10-3 | A | A | A |
| Comparative Example 1 | C | C | C |

Evaluation 4:Ejection Stability

Using each of the inks of Examples 1 to 10 and Comparative Example 1, alphanumeric characters were continuously printed on Xerox P Sheet in an ink jet printer PM-760C (manufactured by Seiko Epson Corp.). The printed state such as dot landing failure or sliding of ink shot position was observed with an eye and evaluated according to the following criteria.

A: Even after printing of 1,000 sheets, dot sliding failure and sliding of ink shot position did not occur.

B: After printing of 100 sheets, dot landing failure and sliding of ink shot position did not occur.

C: Until printing of 100 sheets, generation of dot landing failure or sliding of ink shot position was observed.

The evaluation results are shown in Tables 22 and 23.

Evaluation 5: Dispersion Stability

The inks of Examples 1 to 10 and Comparative Example 1 each was placed in a cylindrical glass tube (sedimentation tube) and after tightly capping, left standing at 60° C. for 2 weeks and whether the pigment was sedimented was examined. At the same time, each ink was placed in a glass-made sample bottle and after tightly capping, left standing under the same conditions as above and the change in viscosity was examined. The results obtained were evaluated according to the following criteria.

A: No change in viscosity and no sedimentation of pigment.

B: No sedimentation of pigment but the viscosity was elevated.

C: The pigment sedimented.

The evaluation results are shown in Tables 22 and 23.

TABLE 22

|  |  | Evaluation 4, ejection stability | Evaluation 5, dispersion stability |
|---|---|---|---|
| Example 1 | Black ink | A | A |
|  | Magenta ink | A | A |
|  | Cyan ink | A | A |
|  | Yellow ink | A | A |
| Example 2-1 | Black ink | A | A |
| Example 2-2 | Magenta ink | A | A |
| Example 2-3 | Cyan ink | A | A |
|  | Yellow ink | A |  |
| Example 3-1 | Black ink | A | A |
| Example 3-2 | Magenta ink | A | A |
| Example 3-3 | Cyan ink | A | A |
|  | Yellow ink | A | A |
| Example 4-1 | Black ink | A | A |
| Example 4-2 | Magenta ink | A | A |
| Example 4-3 | Cyan ink | A | A |
|  | Yellow ink | A | A |
| Example 5 | Black ink | A | A |
|  | Magenta ink | A | A |
|  | Cyan ink | A | A |
|  | Yellow ink | A | A |
| Example 6 | Black ink | A | A |
|  | Magenta ink | A | A |
|  | Cyan ink | A | A |
|  | Yellow ink | A | A |

TABLE 23

|  |  | Evaluation 4, ejection stability | Evaluation 5, dispersion stability |
|---|---|---|---|
| Example 7-1 | Black ink | A | A |
| Example 7-2 | Magenta ink | A | A |
| Example 7-3 | Cyan ink | A | A |
|  | Yellow ink | A | A |

TABLE 23-continued

|  |  | Evaluation 4, ejection stability | Evaluation 5, dispersion stability |
|---|---|---|---|
| Example 8-1 | Black ink | A | A |
| Example 8-2 | Magenta ink | A | A |
| Example 8-3 | Cyan ink | A | A |
|  | Yellow ink | A | A |
| Example 9-1 | Black ink | A | A |
| Example 9-2 | Magenta ink | A | A |
| Example 9-1 | Cyan ink | A | A |
|  | Yellow ink | A | A |
| Example 10-1 | Black ink | A | A |
| Example 10-2 | Magenta ink | A | A |
| Example 10-3 | Cyan ink | A | A |
|  | Yellow ink | A | A |
| Comparative Example 1 | Black ink | C | C |
|  | Magenta ink | C | C |
|  | Cyan ink | C | C |
|  | Yellow ink | C | C |

The inks of Examples 11 to 20 and Comparative Example 1 each was subjected to the "tests of Evaluation 1: printing quality (blurring), Evaluation 2: color bleeding, Evaluation 3: evaluation of OD value" in the same manner as above. In addition, each ink was tested on the scratch resistance. The evaluation results are shown in Table 24.

Evaluation 6: Scratch Resistance

The print obtained by the printing performed according to the method of Evaluation 1 was air dried for 24 hours and thereafter, the printed letters were rubbed with an aqueous yellow fluorescent pen (ZEBRA PEN 2 (trademark), manufactured by ZEBRA) under a marking pressure of $4.9 \times 10^5$ N/m$^2$. The degree of staining in the yellow arm was observed with an eye and evaluated according to the following criteria.

A: Absolutely no staining even by rubbing three times

B: No staining by rubbing twice but some paper sheets stained by third rubbing

C: No staining by rubbing once but some paper sheets stained by second rubbing

D: Some paper sheets stained by rubbing once

TABLE 24

|  | Evaluation 1, printing quality (blurring) | Evaluation 2, color bleeding | Evaluation 3, OD value | Evaluation 6, scratch resistance |
|---|---|---|---|---|
| Example 11-1 | A | A | A | A |
| Example 11-2 | A | A | A | A |
| Example 12-1 | A | A | A | A |
| Example 12-2 | A | A | A | A |
| Example 12-3 | A | A | A | A |
| Example 12-4 | A | A | A | A |
| Example 13-1 | A | A | A | A |
| Example 13-2 | A | A | A | A |
| Example 13-3 | A | A | A | A |
| Example 13-4 | A | A | A | A |
| Example 14-1 | A | A | A | A |
| Example 14-2 | A | A | A | A |
| Example 14-3 | A | A | A | A |
| Example 14-4 | A | A | A | A |
| Example 15-1 | A | A | A | A |
| Example 15-2 | A | A | A | A |
| Example 16-1 | A | A | A | A |
| Example 16-2 | A | A | A | A |
| Example 17-1 | A | A | A | A |
| Example 17-2 | A | A | A | A |
| Example 17-3 | A | A | A | A |

TABLE 24-continued

| | Evaluation 1, printing quality (blurring) | Evaluation 2, color bleeding | Evaluation 3, OD value | Evaluation 6, scratch resistance |
|---|---|---|---|---|
| Example 17-4 | A | A | A | A |
| Example 18-1 | A | A | A | A |
| Example 18-2 | A | A | A | A |
| Example 18-3 | A | A | A | A |
| Example 18-4 | A | A | A | A |
| Example 19-1 | A | A | A | A |
| Example 19-2 | A | A | A | A |
| Example 19-3 | A | A | A | A |
| Example 19-4 | A | A | A | A |
| Example 20-1 | A | A | A | A |
| Example 20-2 | A | A | A | A |
| Example 20 3 | A | A | A | A |
| Example 20 4 | A | A | A | A |
| Comparative Example 1 | C | C | C | C |

As described in detail above, the present invention is characterized by comprising an ink composition comprising at least a water-soluble organic solvent, water and a coloring agent comprising a coloring material enclosed with a polymer having an anionic group (or a coloring agent having an anionic group and comprising a coloring material enclosed with a polymer having a crosslinked composition), and an ink composition comprising at least a water soluble organic solvent, water and a coloring agent comprising a coloring material enclosed with a polymer having a cationic group (or a coloring agent having a cationic group and comprising a coloring material enclosed with a polymer having a crosslinked structure), whereby a high-quality image free of blurring, color bleeding or the like and having high printing density and excellent color forming property can be obtained on a recording medium such as plain paper or recycled paper.

Furthermore, the present invention is characterized in that the above-described composition further comprises a polymer fine particle (anionic polymer fine particle or cationic fine particle), whereby a high-quality image free of blurring, color bleeding or the like and having high printing density, excellent color forming property, good fixing properly and high scratch resistance can be obtained not only on plain paper or recycled paper but also on all kinds of recording mediums.

While the invention has been described in detail and with reference to specific example thereof,it will be apparent to one skilled in the art that various changes and the spirit and scope thereof.

What is claimed is:

1. An ink jet recording method comprising a step of bringing a first ink composition into contact with a second ink composition on a recording medium to form an aggregate,
said first ink composition comprising at least a water-soluble organic solvent, water and a coloring agent comprising a coloring material encapsulated with a polymer having an anionic group that is obtained from a polymerizable surfactant having the anionic group,
said second ink composition comprising at least a water-soluble organic solvent, water and a coloring agent comprising a coloring material encapsulated with a polymer having a cationic group that is obtained from a polymerizable surfactant having the cationic group.

2. The ink jet recording method according to claim 1, wherein at least one of said polymer having an anionic group and said polymer having a cationic group has a crosslinked structure.

3. The ink jet recording method according to claim 2 wherein said first ink composition further comprises anionic polymer fine particles and/or said second ink composition further comprises cationic polymer fine particles.

4. The ink jet recording method according to claim 1, wherein said first ink composition further comprises anionic polymer fine particles and/or said second ink composition further comprises cationic polymer fine particles.

5. The ink jet recording method according to claim 4, wherein said anionic polymer fine particles and said cationic polymer fine particles have a film forming property.

6. The ink jet recording method according to claim 5, wherein said anionic polymer fine particles and said cationic polymer fine particles each has a glass transition temperature of 30° C. or lower.

7. The ink jet recording method according to claim 4, wherein said anionic polymer fine particles and said cationic polymer fine particles each has a glass transition temperature of 30° C. or lower.

8. The ink jet recording method according to claim 1, wherein said anionic group is selected from the group consisting of a sulfone group, a sulfonic acid group, a phospho group, a carboxyl group, a carbonyl group and salts thereof.

9. The ink jet recording method according to claim 1, wherein said cationic group is selected from the group consisting of a primary fatty amine salt, a secondary fatty amine salt, a tertiary fatty amine salt and a quaternary ammonium salt.

10. The ink jet recording method according to claim 1, wherein at least one of said polymer having an anionic group and said polymer having a cationic group mainly comprises one or more members selected from the group consisting of a vinyl polymer, a poly(meth)acrylic acid ester, a styrene (meth)acrylic acid copolymer, a polyester, a polyamide, a polyimide, a polyurethane, an amino-containing polymer, a silicon-containing polymer, a sulfur-containing polymer, a fluorine-containing polymer and an epoxy resin.

11. The ink jet recording method according to claim 1, wherein said coloring material is a pigment or an oil-soluble dye.

12. An ink jet recording method comprising a step of bringing a first ink composition into contact with a second ink composition on a recording medium to form an aggregate,
said first ink composition comprising at least a water-soluble organic solvent, water and a coloring agent comprising a coloring material encapsulated with a polymer having an anionic group,
said second ink composition comprising at least a water-soluble organic solvent, water and a coloring agent comprising a coloring material encapsulated with a polymer having a cationic group, wherein said coloring agent comprising a coloring material encapsulated with a polymer having an anionic group optionally has a crosslinked structure and is obtained by dispersing a coloring material in water using a dispersant having an anionic group and a polymerizable group and then emulsion-polymerizing the dispersion at least together with a copolymerizable monomer in the presence of a polymerization initiator.

13. The ink jet recording method according to claim 12, wherein said polymerizable group is an unsaturated hydrocarbon group.

14. The ink jet recording method according to claim 13, wherein said unsaturated hydrocarbon group is one or more members selected from the group consisting of a vinyl group, an allyl group, an acryloyl group, a methacryloyl group, a propenyl group, a vinylidene group and a vinylene group.

15. The ink jet recording method according to claim 12, wherein said dispersant having a polymerizable group is a polymerizable surfactant.

16. An ink jet recording method comprising a step of bringing a first ink composition into contact with a second ink composition on a recording medium to form an aggregate,
said first ink composition comprising at least a water-soluble organic solvent, water and a coloring agent comprising a coloring material encapsulated with a polymer having an anionic group,
said second ink composition comprising at least a water-soluble organic solvent, water and a coloring agent comprising a coloring material encapsulated with a polymer having a cationic group, wherein said coloring agent comprising a coloring material encapsulated with a polymer having a cationic group optionally has a crosslinked structure and is obtained by dispersing a coloring material using a dispersant having a cationic group and a polymerizable group and then emulsion-polymerizing the dispersion at least together with a copolymerizable monomer in the presence of a polymerization initiator.

17. The ink jet recording method according to claim 16, wherein said polymerizable group is an unsaturated hydrocarbon group.

18. The ink jet recording method according to claim 17, wherein said unsaturated hydrocarbon group is one or more members selected from the group consisting of a vinyl group, an allyl group, an acryloyl group, a methacryloyl group, a propenyl group, a vinylidene group and a vinylene group.

19. The ink jet recording method according to claim 16, wherein said dispersant having a polymerizable group is a polymerizable surfactant.

20. An ink set for ink jet recording comprising:
a color ink composition comprising at least a water-soluble organic solvent, water and a coloring agent comprising a coloring material encapsulated with a polymer having an anionic group that is obtained from a polymerizable surfactant having the anionic group; and
a black ink composition comprising at least a water-soluble organic solvent, water and a coloring agent comprising a coloring material encapsulated with a polymer having a cationic group that is obtained from a polymerizable surfactant having the cationic group.

21. The ink set according to claim 20, wherein at least one of said polymer having an anionic group and said polymer having a cationic group has a crosslinked structure.

22. The ink set according to claim 21, wherein said color ink composition further comprises anionic polymer fine particles and/or said black ink composition further comprises cationic polymer fine particles.

23. The ink set according to claim 20, wherein said color ink composition further comprises anionic polymer fine particles and/or said black ink composition further comprises cationic polymer fine particles.

24. The ink set according to claim 23, wherein said anionic polymer fine particles and said cationic polymer fine particles have a film forming property.

25. The ink set according to claim 24, wherein said anionic polymer fine particles and said cationic polymer fine particles each has a glass transition temperature of 30° C. or lower.

26. The ink set according to claim 23, wherein said anionic polymer fine particles and said cationic polymer fine particles each has a glass transition temperature of 30° C. or lower.

27. The ink set according to claim 20, wherein said color ink composition further comprises at least one of an anionic surfactant and a nonionic surfactant.

28. The ink set according to claim 20, wherein said color ink composition further comprises an acetylene glycol surfactant.

29. The ink set according to claim 20, wherein said color ink composition further comprises a glycol ether.

30. The ink set according to claim 20, wherein said color ink composition further comprises a 1,2-alkylene glycol.

31. The ink set according to claim 20, wherein said color ink composition further comprises at least one of an anionic surfactant and a nonionic surfactant and at least one of a glycol ether and a 1,2-alkylene glycol.

32. The ink set according to claim 20, wherein said color ink composition further comprises an acetylene glycol surfactant and at least one of a glycol ether and a 1,2-alkylene glycol.

33. The ink set according to claim 20, wherein said color ink includes a yellow ink, a magenta ink and a cyan ink.

34. The ink set according to claim 20, wherein said color ink includes a yellow ink, a magenta ink, a light magenta ink, a cyan ink and a light cyan ink.

35. The ink set according to claim 20, wherein said black ink has a surface tension of 45 to 60 mN/m and said color ink has a surface tension of 25 to 45 mN/m.

36. The ink set according to claim 20, wherein said anionic group is selected from the group consisting of a sulfone group, a sulfonic acid group, a phospho group, a carboxyl group, a carbonyl group and salts thereof.

37. The ink set according to claim 20, wherein said cationic group is selected from the group consisting of a primary fatty amine salt, a secondary fatty amine salt, a tertiary fatty amine salt and a quaternary ammonium salt.

38. The ink set according to claim 20, wherein at least one of said polymer having an anionic group and said polymer having a cationic group mainly comprises one or more members selected from the group consisting of a vinyl polymer, a poly(meth)acrylic acid ester, a styrene(meth) acrylic acid copolymer, a polyester, a polyamide, a polyimide, a polyurethane, an amino-containing polymer, a silicon-containing polymer, a sulfur-containing polymer, a fluorine-containing polymer and an epoxy resin.

39. The ink set according to claim 20, wherein said coloring material is a pigment or an oil-soluble dye.

40. An ink set for ink jet recording comprising:
a color ink composition comprising at least a water-soluble organic solvent, water and a coloring agent comprising a coloring material encapsulated with a polymer having a cationic group that is obtained from a polymerizable surfactant having he cationic group; and
a black ink composition comprising at least a water-soluble organic solvent, water and a coloring agent comprising a coloring material encapsulated with a polymer having an anionic group that is obtained from a polymerizable surfactant having the anionic group.

41. The ink set according to claim 40, wherein at least one of said polymer having a cationic group and said polymer having an anionic group has a crosslinked structure.

42. The ink set according to claim 41, wherein said color ink composition further comprises cationic polymer fine particles and/or said black ink composition further comprises anionic polymer fine particles.

43. The ink set according to claim 40, wherein said color ink composition further comprises cationic polymer fine particles and/or said black ink composition further comprises anionic polymer fine particles.

44. The ink set according to claim 43, wherein said anionic polymer fine particles and said cationic polymer fine particles have a film forming property.

45. The ink set according to claim 43, wherein said anionic polymer fine particles and said cationic polymer fine particles each has a glass transition temperature of 30° C. or lower.

46. The ink set according to claim 40, wherein said color ink composition further comprises at least one of a cationic surfactant and a nonionic surfactant.

47. The ink set according to claim 40, wherein said color ink composition further comprises an acetylene glycol surfactant.

48. The ink set according to claim 40, wherein said color ink composition further comprises a glycol ether.

49. The ink set according to claim 40, wherein said color ink composition further comprises a 1,2-alkylene glycol.

50. The ink set according to claim 40, wherein said color ink composition further comprises at least one of a cationic surfactant and a nonionic surfactant and at least one of a glycol ether and a 1,2-alkylene glycol.

51. The ink set according to claim 40, wherein said color ink composition further comprises an acetylene glycol surfactant and at least one of a glycol ether and a 1,2-alkylene glycol.

52. The ink set according to claim 40, wherein said color ink includes a yellow ink, a magenta ink and a cyan ink.

53. The ink set according to claim 40, wherein said color ink includes a yellow ink, a magenta ink, a light magenta ink, a cyan ink and a light cyan ink.

54. The ink set according to claim 40, wherein said black ink has a surface tension of 45 to 60 mN/m and said color ink has a surface tension of 25 to 45 mN/m.

55. The ink set according to claim 40, wherein said anionic group is selected from the group consisting of a sulfone group, a sulfonic acid group, a phospho group, a carboxyl group, a carbonyl group and salts thereof.

56. The ink set according to claim 40, wherein said cationic group is selected from the group consisting of a primary fatty amine salt, a secondary fatty amine salt, a tertiary fatty amine salt and a quaternary ammonium salt.

57. The ink set according to claim 40, wherein said polymer mainly comprises one or more members selected from the group consisting of a vinyl polymer, a poly(meth)acrylic acid ester, a styrene (meth)acrylic acid copolymer, a polyester, a polyamide, a polyimide, a polyurethane, an amino-containing polymer, a silicon-containing polymer, a sulfur-containing polymer, a fluorine-containing polymer and an epoxy resin.

58. The ink set according to claim 40, wherein said coloring material is a pigment or an oil-soluble dye.

59. An ink set for ink jet recording comprising:
a color ink composition comprising at least a water-soluble organic solvent, water and a coloring agent comprising a coloring material encapsulated with a polymer having an anionic group; and
a black ink composition comprising at least a water-soluble organic solvent, water and a coloring agent comprising a coloring material encapsulated with a polymer having a cationic group, wherein said coloring agent comprising a coloring material encapsulated with a polymer having an anionic group optionally has a crosslinked structure and is obtained by dispersing a coloring material in water using a dispersant having an anionic group and a polymerizable group and then emulsion-polymerizing the dispersion at least together with a copolymerizable monomer in the presence of a polymerization initiator.

60. The ink set according to claim 59, wherein said polymerizable group is an unsaturated hydrocarbon group.

61. The ink set according to claim 60, wherein said unsaturated hydrocarbon group is one or more members selected from the group consisting of a vinyl group, an allyl group, an acryloyl group, a methacryloyl group, a propenyl group, a vinylidene group and a vinylene group.

62. The ink set according to claim 59, wherein said dispersant having a polymerizable group is a polymerizable surfactant.

63. An ink set for ink jet recording comprising:
a color ink composition comprising at least a water-soluble organic solvent, water and a coloring agent comprising a coloring material encapsulated with a polymer having an anionic group; and
a black ink composition comprising at least a water-soluble organic solvent, water and a coloring agent comprising a coloring material encapsulated with a polymer having a cationic group, wherein said coloring agent comprising a coloring material encapsulated with a polymer having a cationic group optionally had a crosslinked structure and is obtained by dispersing a coloring material in water using a dispersant having a cationic group and a polymerizable group and then emulsion-polymerizing the dispersion at least together with a copolymerizable monomer in the presence of a polymerization initiator.

64. The ink set according to claim 63, wherein said polymerizable group is an unsaturated hydrocarbon group.

65. The ink set according to claim 64, wherein said unsaturated hydrocarbon group is one or more members selected from the group consisting of a vinyl group, an allyl group, an acryloyl group, a methacryloyl group, a propenyl group, a vinylidene group and a vinylene group.

66. The ink set according to claim 63, wherein said dispersant having a polymerizable group is a polymerizable surfactant.

67. An ink set for ink jet recording comprising:
a color ink composition comprising at least a water-soluble organic solvent, water and a coloring agent comprising a coloring material encapsulated with a polymer having a cationic group; and
a black ink composition comprising at least a water-soluble organic solvent, water and a coloring agent comprising a coloring material encapsulated with a polymer having an anionic group, wherein said coloring agent comprising a coloring material encapsulated with a polymer having an anionic group optionally has a crosslinked structure and is obtained by dispersing a coloring material in water using a dispersant having an anionic group and a polymerizable group and then emulsion-polymerizing the dispersion at least together with a copolymerizable monomer in the presence of a polymerization initiator.

68. An ink set for ink jet recording comprising:
a color ink composition comprising at least a water-soluble organic solvent, water and a coloring agent comprising a coloring material encapsulated with a polymer having a cationic group; and
a black ink composition comprising at least a water-soluble organic solvent, water and a coloring agent comprising a coloring material encapsulated with a polymer having an anionic group, wherein said coloring agent comprising a coloring material encapsulated with a polymer having a cationic group optionally has a crosslinked structure and is obtained by dispersing a coloring material in water using a dispersant having a cationic group and a polymerizable group and then emulsion-polymerizing the dispersion at least together with a copolymerizable monomer in the presence of a polymerization initiator.

* * * * *